(12) United States Patent
Yang et al.

(10) Patent No.: US 11,750,338 B2
(45) Date of Patent: Sep. 5, 2023

(54) HYBRID AUTOMATIC REPEAT REQUEST FEEDBACK FOR SIDELINK

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/337,287

(22) Filed: Jun. 2, 2021

(65) Prior Publication Data

US 2022/0393808 A1 Dec. 8, 2022

(51) Int. Cl.
| | |
|---|---|
| H04L 1/1867 | (2023.01) |
| H04W 72/1263 | (2023.01) |
| H04W 72/02 | (2009.01) |
| H04W 72/23 | (2023.01) |
| H04W 92/18 | (2009.01) |

(52) U.S. Cl.
CPC ........... *H04L 1/1896* (2013.01); *H04W 72/02* (2013.01); *H04W 72/1263* (2013.01); *H04W 72/23* (2023.01); *H04W 92/18* (2013.01)

(58) Field of Classification Search
None
See application file for complete search history.

(56) References Cited

U.S. PATENT DOCUMENTS

| | | | | |
|---|---|---|---|---|
| 10,993,141 | B2 * | 4/2021 | Huang | H04W 72/1263 |
| 11,398,883 | B2 * | 7/2022 | Ganesan | H04L 1/1896 |
| 2020/0029318 | A1 * | 1/2020 | Guo | H04W 72/042 |
| 2022/0217690 | A1 * | 7/2022 | Liu | H04W 72/042 |

FOREIGN PATENT DOCUMENTS

WO    WO-2021034779 A1 *  2/2021  ........... H04L 1/1819

* cited by examiner

*Primary Examiner* — Hong S Cho
(74) *Attorney, Agent, or Firm* — Holland & Hart LLP

(57) ABSTRACT

Methods, systems, and devices for wireless communication are described. A device may receive a grant that schedules a set of sidelink occasions associated with sidelink communication from the device, and that indicates a set of uplink occasions for indicating feedback associated with the sidelink communication. The device may transmit a sidelink message during a sidelink occasion of the set of sidelink occasions, and generate feedback information based on the transmitted sidelink message. The feedback information may include an acknowledgement (ACK) or a negative acknowledgment (NACK) associated with the sidelink message. The device may transmit an uplink feedback message including the feedback information during an uplink occasion of the set of uplink occasions. The feedback information may include an indication of the ACK or the NACK.

29 Claims, 18 Drawing Sheets

HYBRID AUTOMATIC REPEAT REQUEST FEEDBACK FOR SIDELINK

FIELD OF TECHNOLOGY

The following relates to wireless communication, including hybrid automatic repeat request (HARQ) feedback for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless communications system may include one or more base stations or one or more network access nodes, each simultaneously supporting wireless communication for multiple communication devices, which may be otherwise known as user equipment (UE). Wireless communication between a UE and a base station may occur over a communication link, such as an access link. Additionally, or alternatively, wireless communication may include sidelink communication between multiple communication devices. Examples of sidelink communication may include vehicle-based communication, which may also be referred to as vehicle-to-everything (V2X) communication, vehicle-to-vehicle (V2V) communication, or cellular V2X (C-V2X) communication. Sidelink communication between UEs may occur over a communication link, such as a sidelink.

SUMMARY

Various aspects of the present disclosure relate to enabling a communication device, such as a UE to support HARQ feedback for sidelink communication in a wireless communications system. The UE may receive a grant that schedules multiple sidelink occasions. The UE may transmit a sidelink message over a sidelink channel (e.g., a physical sidelink control channel (PSCCH) or a physical sidelink shared channel (PSSCH)) during a respective sidelink occasion. The UE may generate HARQ feedback for a respective sidelink occasion based on whether or not the UE receives sidelink feedback message (also referred to as a physical sidelink feedback channel (PSFCH) message) over a sidelink feedback channel (e.g., a PSFCH) during a sidelink feedback occasion (also referred to as a PSFCH occasion).

The UE may generate the HARQ feedback based on receiving the PSFCH message during a PSFCH occasion. In some other examples, the UE may generate the HARQ feedback based on receiving at least one PSFCH message during at least one PSFCH occasion of a set of PSFCH occasions. In other examples, the UE may generate the HARQ feedback based on an absence of a respective PSFCH message during each respective PSFCH occasion of the set of PSFCH occasions. The UE may be configured to support transmission of the HARQ feedback to the network (e.g., a base station) during an uplink occasion (e.g., a physical uplink control channel (PUCCH) occasion), which may be other than a last uplink occasion. By providing the HARQ feedback to the network prior to the last uplink occasion, the UE may experience power saving.

A method for wireless communication at a first UE is described. The method may include receiving a grant that schedules a set of multiple sidelink occasions associated with sidelink communication from the first UE, and that indicates a set of multiple uplink occasions for indicating feedback associated with the sidelink communication, transmitting a sidelink message during a sidelink occasion of the set of multiple sidelink occasions, generating feedback information based on the transmitted sidelink message, the feedback information including an ACK or a NACK associated with the sidelink message, and transmitting an uplink feedback message including the feedback information during an uplink occasion of the set of multiple uplink occasions, the feedback information including an indication of the ACK or the NACK.

An apparatus for wireless communication at a first UE is described. The apparatus may include a processor, memory coupled with the processor, and instructions stored in the memory. The instructions may be executable by the processor to cause the apparatus to receive a grant that schedules a set of multiple sidelink occasions associated with sidelink communication from the first UE, and that indicates a set of multiple uplink occasions for indicating feedback associated with the sidelink communication, transmit a sidelink message during a sidelink occasion of the set of multiple sidelink occasions, generate feedback information based on the transmitted sidelink message, the feedback information including an ACK or a NACK associated with the sidelink message, and transmit an uplink feedback message including the feedback information during an uplink occasion of the set of multiple uplink occasions, the feedback information including an indication of the ACK or the NACK.

Another apparatus for wireless communication at a first UE is described. The apparatus may include means for receiving a grant that schedules a set of multiple sidelink occasions associated with sidelink communication from the first UE, and that indicates a set of multiple uplink occasions for indicating feedback associated with the sidelink communication, means for transmitting a sidelink message during a sidelink occasion of the set of multiple sidelink occasions, means for generating feedback information based on the transmitted sidelink message, the feedback information including an ACK or a NACK associated with the sidelink message, and means for transmitting an uplink feedback message including the feedback information during an uplink occasion of the set of multiple uplink occasions, the feedback information including an indication of the ACK or the NACK.

A non-transitory computer-readable medium storing code for wireless communication at a first UE is described. The code may include instructions executable by a processor to receive a grant that schedules a set of multiple sidelink occasions associated with sidelink communication from the first UE, and that indicates a set of multiple uplink occasions for indicating feedback associated with the sidelink communication, transmit a sidelink message during a sidelink occasion of the set of multiple sidelink occasions, generate feedback information based on the transmitted sidelink message, the feedback information including an ACK or a NACK associated with the sidelink message, and transmit an uplink feedback message including the feedback information during an uplink occasion of the set of multiple uplink occasions, the feedback information including an indication of the ACK or the NACK.

Some examples of the method, apparatuses, and non-transitory computer-readable medium described herein may further include operations, features, means, or instructions for receiving a sidelink feedback message during a sidelink feedback occasion associated with the sidelink occasion based on the transmitted sidelink message, generating the feedback information based on the sidelink feedback message including the ACK, and transmitting the uplink feedback message including the feedback information during the uplink occasion of the set of multiple uplink occasions based on the sidelink feedback message including the ACK, the uplink occasion including an uplink occasion other than a last uplink occasion of the set of multiple uplink occasions.

Some examples of the method, apparatuses, and non-transitory computer-readable medium described herein may further include operations, features, means, or instructions for generating the feedback information based on an absence of a sidelink feedback message during a sidelink feedback occasion associated with the sidelink occasion based on the transmitted sidelink message.

Some examples of the method, apparatuses, and non-transitory computer-readable medium described herein may further include operations, features, means, or instructions for identifying one or more sidelink resources associated with one or more subsequent sidelink occasions of the set of multiple sidelink occasions as unavailable sidelink resources based on the feedback information including the ACK.

Some examples of the method, apparatuses, and non-transitory computer-readable medium described herein may further include operations, features, means, or instructions for identifying one or more uplink resources associated with one or more subsequent uplink occasions of the set of multiple uplink occasions as unavailable uplink resources based on the feedback information including the ACK.

Some examples of the method, apparatuses, and non-transitory computer-readable medium described herein may further include operations, features, means, or instructions for receiving a sidelink feedback message during a sidelink feedback occasion associated with the sidelink occasion based on the transmitted sidelink message and generating the feedback information based on the sidelink feedback message including the NACK.

Some examples of the method, apparatuses, and non-transitory computer-readable medium described herein may further include operations, features, means, or instructions for refraining from transmitting the uplink feedback message including the feedback information during the uplink occasion of the set of multiple uplink occasions based on the sidelink feedback message including the NACK.

Some examples of the method, apparatuses, and non-transitory computer-readable medium described herein may further include operations, features, means, or instructions for identifying one or more sidelink resources associated with one or more subsequent sidelink occasions of the set of multiple sidelink occasions as available sidelink resources based on the sidelink feedback message including the ACK.

Some examples of the method, apparatuses, and non-transitory computer-readable medium described herein may further include operations, features, means, or instructions for identifying one or more uplink resources associated with one or more subsequent uplink occasions of the set of multiple uplink occasions as available uplink resources based on the sidelink feedback message including the NACK.

Some examples of the method, apparatuses, and non-transitory computer-readable medium described herein may further include operations, features, means, or instructions for refraining from transmitting the uplink feedback message including the feedback information during the uplink occasion of the set of multiple uplink occasions may be based on that the sidelink feedback message includes the NACK and that the uplink occasion includes an uplink occasion other than a last uplink occasion of the set of multiple uplink occasions.

Some examples of the method, apparatuses, and non-transitory computer-readable medium described herein may further include operations, features, means, or instructions for determining that the uplink occasion of the set of multiple uplink occasions includes a last uplink occasion of the set of multiple uplink occasions and transmitting the uplink feedback message including the feedback information during the last uplink occasion of the set of multiple uplink occasions based on the feedback information including the NACK and that the uplink occasion includes the last uplink occasion of the set of multiple uplink occasions.

Some examples of the method, apparatuses, and non-transitory computer-readable medium described herein may further include operations, features, means, or instructions for receiving control signaling indicating a feedback reporting configuration and transmitting the uplink feedback message during the uplink occasion of the set of multiple uplink occasions based on the feedback reporting configuration.

Some examples of the method, apparatuses, and non-transitory computer-readable medium described herein may further include operations, features, means, or instructions for receiving a DCI indicating the grant that schedules the set of multiple sidelink occasions associated with the sidelink communication from the first UE to a second UE or a group of UEs, and that indicates the set of multiple uplink occasions for indicating the feedback information associated with the sidelink communication.

Some examples of the method, apparatuses, and non-transitory computer-readable medium described herein may further include operations, features, means, or instructions for determining the uplink occasion of the set of multiple uplink occasions based on an uplink resource indicator associated with the DCI and determining the sidelink occasion of the set of multiple sidelink occasions based on a feedback timing indicator associated with the DCI.

Some examples of the method, apparatuses, and non-transitory computer-readable medium described herein may further include operations, features, means, or instructions for determining that the sidelink occasion corresponds to the uplink occasion based on one or more of the uplink resource indicator or the feedback timing indicator and where transmitting the uplink feedback message including the feedback information during the uplink occasion of the set of multiple uplink occasions may be based on determining that the sidelink occasion corresponds to the uplink occasion.

In some examples of the method, apparatuses, and non-transitory computer-readable medium described herein, the sidelink occasions are associated with transmissions of a same transport block.

In some examples of the method, apparatuses, and non-transitory computer-readable medium described herein, the feedback timing indicator includes a HARQ feedback timing indicator identifying a duration between a sidelink feedback message and the uplink feedback message, the sidelink feedback message corresponding to a PSFCH transmission and the uplink feedback message corresponding to a PUCCH transmission.

In some examples of the method, apparatuses, and non-transitory computer-readable medium described herein, each respective sidelink occasion of the set of multiple sidelink occasions corresponds to each respective uplink occasion of the set of multiple uplink occasions.

In some examples of the method, apparatuses, and non-transitory computer-readable medium described herein, each respective sidelink occasion of the set of multiple sidelink occasions occurs before each respective uplink occasion of the set of multiple uplink occasions.

In some examples of the method, apparatuses, and non-transitory computer-readable medium described herein, the grant schedules the transmitting of the uplink feedback message to occur after monitoring for a sidelink feedback message receiving of a sidelink feedback message and before transmitting a second sidelink message, wherein a gap between the monitoring for the sidelink feedback message and the transmitting of the uplink feedback message is greater than a threshold.

Some examples of the method, apparatuses, and non-transitory computer-readable medium described herein may further include operations, features, means, or instructions for transmitting the uplink feedback message after a second sidelink occasion of the set of multiple sidelink occasions based on the second sidelink occasion of the set of multiple sidelink occasions being scheduled before the uplink occasion of the set of multiple uplink occasions.

In some examples of the method, apparatuses, and non-transitory computer-readable medium described herein, the sidelink message corresponds to one or more of a PSCCH transmission or a PSSCH transmission, and a sidelink feedback message corresponds to a PSFCH transmission.

In some examples of the method, apparatuses, and non-transitory computer-readable medium described herein, the set of multiple sidelink occasions includes one or more PSCCH occasions or one or more PSSCH occasions, and the set of multiple uplink occasions includes one or more PUCCH occasions.

A method for wireless communication at a base station is described. The method may include transmitting a grant that schedules a set of multiple sidelink occasions associated with sidelink communication from a UE, and that indicates a set of multiple uplink occasions for indicating feedback associated with the sidelink communication and receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

An apparatus for wireless communication at a base station is described. The apparatus may include a processor, memory coupled with the processor, and instructions stored in the memory. The instructions may be executable by the processor to cause the apparatus to transmit a grant that schedules a set of multiple sidelink occasions associated with sidelink communication from a UE, and that indicates a set of multiple uplink occasions for indicating feedback associated with the sidelink communication and receive an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

Another apparatus for wireless communication at a base station is described. The apparatus may include means for transmitting a grant that schedules a set of multiple sidelink occasions associated with sidelink communication from a UE, and that indicates a set of multiple uplink occasions for indicating feedback associated with the sidelink communication and means for receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

A non-transitory computer-readable medium storing code for wireless communication at a base station is described. The code may include instructions executable by a processor to transmit a grant that schedules a set of multiple sidelink occasions associated with sidelink communication from a UE, and that indicates a set of multiple uplink occasions for indicating feedback associated with the sidelink communication and receive an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

Some examples of the method, apparatuses, and non-transitory computer-readable medium described herein may further include operations, features, means, or instructions for releasing one or more sidelink resources associated with one or more subsequent sidelink occasions of the set of multiple sidelink occasions and one or more uplink resources associated with one or more subsequent uplink occasions of the set of multiple uplink occasions based on the uplink feedback message including the ACK.

Some examples of the method, apparatuses, and non-transitory computer-readable medium described herein may further include operations, features, means, or instructions for transmitting control signaling indicating a feedback reporting configuration and receiving the uplink feedback message during the uplink occasion based on the feedback reporting configuration.

Some examples of the method, apparatuses, and non-transitory computer-readable medium described herein may further include operations, features, means, or instructions for transmitting a DCI indicating the grant that schedules the set of multiple sidelink occasions associated with the sidelink communication from the UE, and that indicates the set of multiple uplink occasions for indicating the feedback associated with the sidelink communication.

In some examples of the method, apparatuses, and non-transitory computer-readable medium described herein, an uplink resource indicator associated with the DCI identifies the uplink occasion of the set of multiple uplink occasions, the uplink resource indicator including a PUCCH resource indicator.

DETAILED DESCRIPTION

Figure 1:
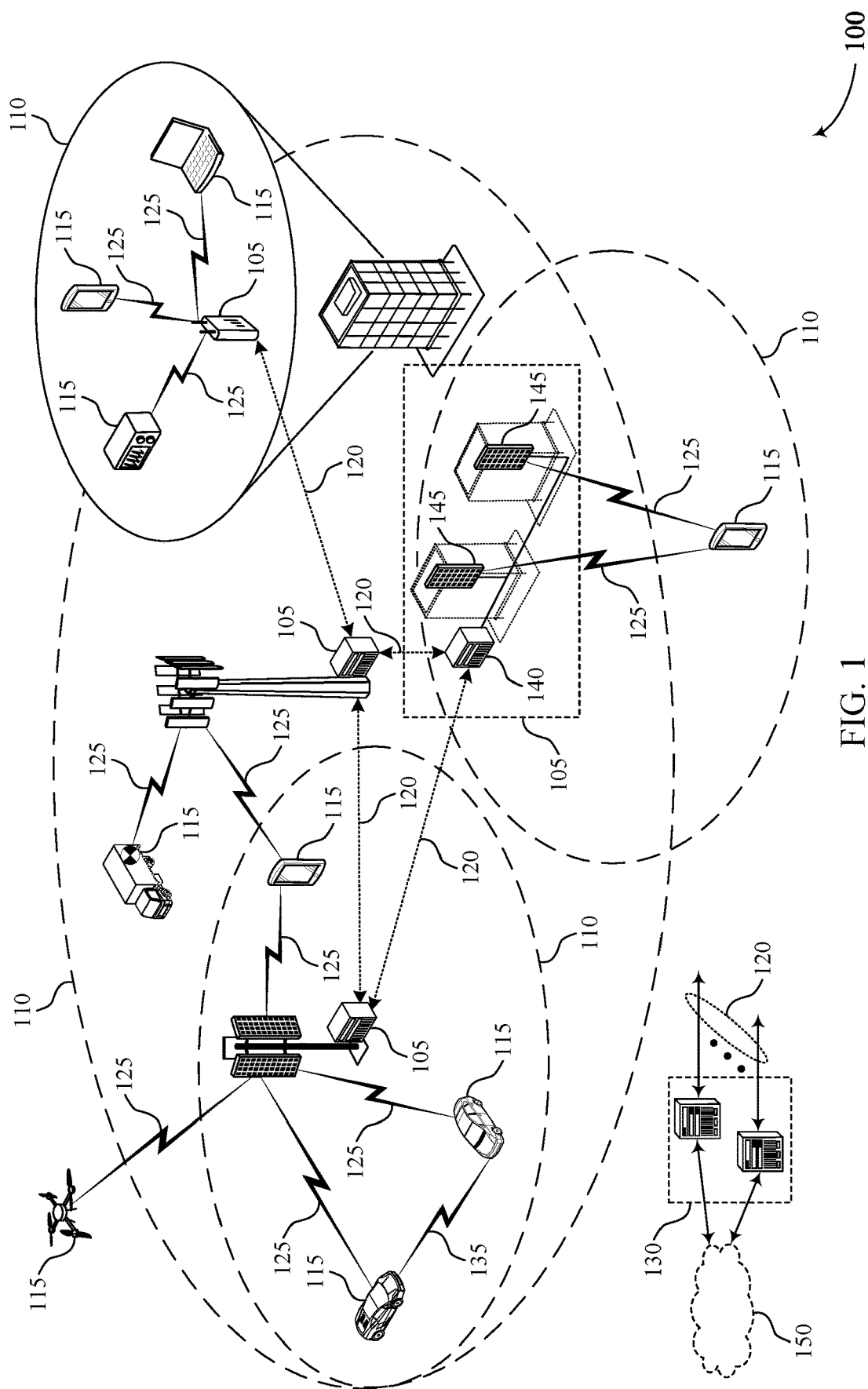
FIGS. 1 and 2 illustrate examples of wireless communications systems that support HARQ feedback for sidelink in accordance with aspects of the present disclosure.

A wireless communications system may include communication devices, such as a base station and a UE that may support wireless communications using one or multiple radio access technologies. In the wireless communications system, wireless communications between a UE and a base station may occur over a communication link, such as an access link (also referred to as a Uu interface). The wireless communications system may also support sidelink communications between multiple communication devices, such as multiple UEs. Sidelink communications may utilize specific time-frequency resources (e.g., sidelink occasions). In some cases, a base station may schedule or allocate sidelink occasions. Similarly, the wireless communications system may also support sidelink feedback between multiple communication devices, such as multiple UEs. A communication device may utilize specific time-frequency resources (e.g., a sidelink feedback occasion) to transmit sidelink feedback. Sidelink communications between multiple UEs may occur over a communication link, such as a sidelink (also referred to as a PC5 interface). In some examples, the sidelink communications may be a unicast sidelink message. For example, the UE may transmit the unicast sidelink message to a single UE in the wireless communications system. In some other examples, the sidelink communications may be a multicast sidelink message. For example, the UE may transmit the multicast sidelink message to a group of UEs in the wireless communications system. In other examples, the sidelink communications may be a broadcast sidelink message. For example, the UE may broadcast the broadcast sidelink message to all UEs in the wireless communications system.

The base station may provide to the UE a grant that schedules sidelink occasions and allocates sidelink resources (e.g., slot durations, subcarriers, carriers) for sidelink communication. The UE may transmit a sidelink communication (e.g. via a physical sidelink control channel (PSCCH) or a physical sidelink shared channel (PSSCH)) to another UE during a respective sidelink occasion and on respective sidelink resources of the respective sidelink occasion. In some cases, some sidelink occasions and sidelink resources may be wasted by the UE. For example, if the UE performs a successful sidelink communication (e.g., a sidelink transmission) to the other UE, subsequent sidelink occasions and sidelink resources scheduled by the grant may be unused. Additionally, because the UE may be configured to provide uplink feedback to the base station about the sidelink communication only after all of the sidelink occasions pass, the UE might be unable to provide an earlier uplink feedback (e.g., via a physical uplink control channel (PUCCH)) to the base station and release of the sidelink occasions and the sidelink resources (e.g., for allocation to other UEs).

Various aspects of the present disclosure relate to enabling the UE to transmit uplink feedback in response to sidelink feedback (e.g., via a physical sidelink feedback channel (PSFCH)) from another UE indicating an acknowledgement (ACK) (i.e., successful reception of a sidelink transmission at the other UE). As such, the UE may transmit early uplink feedback to a base station without waiting for pending sidelink occasions. The UE may infer that the pending sidelink occasions and resources are reclaimed by the base station, which may handle these resources as available and may allocate the resources to the other UEs in the wireless communications system. In some cases, the UE may be configured to skip uplink feedback related to a negative acknowledgement (NACK) (i.e., an unsuccessful reception of a sidelink transmission at the other UE). However, in some cases, where a sidelink communication using a last sidelink occasion is unsuccessful, the UE may determine to transmit a NACK to the base station, so that the base station may allocate additional sidelink occasions for additional sidelink communication attempts.

Aspects of the present disclosure may be implemented to realize one or more of the following advantages. The described techniques may provide for reduced power consumption at the UE based on early uplink feedback. For example, the described techniques may enable the UE to determine to provide early uplink feedback based no sidelink feedback from the other UE. As a result, the UE may experience reduced power consumption and improved battery life, among other benefits.

Aspects of the disclosure are initially described in the context of wireless communications systems. Aspects of the disclosure are further illustrated by and described with reference to apparatus diagrams, system diagrams, and flowcharts that relate to HARQ feedback for sidelink.

FIG. 1 illustrates an example of a wireless communications system 100 that supports HARQ feedback for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communication system 100 may support multiple resource allocation modes for sidelink communications. According to a first resource allocation mode, a base station 105 may schedule resources to be used by a UE 115 for wireless communication. For example, a base station 105 may schedule sidelink resources to be used by a UE 115 for sidelink communication with one or more other UEs 115 in the wireless communication system 100. According to a second resource allocation mode, a UE 115 may determine resources to be used by a UE 115 for wireless communication. For example, a UE 115 may determine sidelink resources to use for sidelink communication with one or more other UEs 115 in the wireless communication system 100. As such, in the second resource allocation mode, a base station 105 does not schedule resources to be used by a UE 115 for wireless communication in the wireless communication system 100. The resources may be configured by a base station 105 or may be pre-configured resources in the wireless communication system 100.

A base station 105 may operate in accordance with the first resource allocation mode. In some examples, a base station 105 may provide a UE 115 with a grant via a communication link 125. For example, a base station 105 may transmit, to a UE 115 via a communication link 125, a DCI message carrying a grant. The grant may allocate occasions and resources for wireless communications with one or more other UEs. For example, a UE 115 may communicate (e.g., recite sidelink communication, transmit sidelink communication) with another UE 115 via a communication link 135 using resources (e.g., sidelink resources) allocated by the base station 105.

A base station 105 may allocate multiple occasions. In some cases, a base station 105 may allocate a maximum number of occasions. For example, a grant may schedule three occasions for wireless communication. In some examples, the base station 105 may transmit the grant in a sidelink control information (SCI) message over a communication link 135. The base station 105 may allocate up to three occasions within a single SCI message. The UE 115 may receive the SCI message and may communicate (e.g., recite sidelink communication, transmit sidelink communication) with another UE 115 via a communication link 135 during one or more of the occasions based on the grant.

In the wireless communication system 100, a UE 115 may operate according to a feedback mode (e.g., a HARQ feedback mode). In some examples, a UE 115 may operate according to a sidelink feedback mode (e.g., a sidelink HARQ feedback mode) associated with sidelink communication over a communication link 135. In some examples, a sidelink feedback mode may be associated with groupcast sidelink communication. Each sidelink communication associated with the groupcast sidelink communication may correspond to a respective sidelink feedback message (e.g., a HARQ-ACK, a HARQ-NACK). For example, each receiving UE 115 of a group of receiving UEs 115 may transmit feedback information (e.g., a HARQ-ACK, a HARQ-NACK) to a transmitting UE 115 (e.g., via a groupcast communication).

In some other examples, a sidelink feedback mode may be associated with groupcast sidelink communication with distance-based feedback information. For example, a receiving UE 115 of a group of receiving UEs 115 may receive a sidelink communication (e.g., an SCI), but may be unable to correctly decode a subsequent sidelink communication (e.g., a PSSCH transmission). As a result, the receiving UE 115 may generate and transmit feedback information (e.g., a HARQ-NACK) if the receiving UE 115 is within a threshold distance from a transmitting UE 115. Alternatively, the receiving UE 115 of the group of receiving UEs 115 may correctly decode the subsequent sidelink communication (e.g., a PSSCH transmission), or may determine that the receiving UE 115 is not within the threshold distance from the transmitting UE 115 (e.g., based on geographic information of the transmitting UE 115 and the receiving UE 115). As a result, the receiving UE 115 may refrain from transmitting the feedback information. In other examples, a sidelink feedback mode may be associated with unicast sidelink communication. For example, a UE 115 may receive a sidelink communication (e.g., over a PSSCH) and may transmit feedback information (e.g., a HARQ-ACK, a HARQ-NACK) over a PSFCH based on a decoding result of the sidelink communication.

A UE 115 may be configured to provide an uplink feedback message (e.g., via a PUCCH) to a base station 105 via a communication link 125. In some cases, the uplink feedback message may indicate to the base station 105 that a sidelink communication between at least two UEs 115 is successful or unsuccessful. For example, a UE 115 may transmit a sidelink communication to another UE 115 via a communication link 135. The other UE 115 may successfully receive the sidelink communication and transmit feedback information (e.g., a HARQ-ACK message) to the UE 115 via the communication link 135. Upon receipt of the feedback information, the UE 115 may transmit feedback information (e.g., a HARQ-ACK message) to the base station 105 via the communication link 125. Similarly, the other UE 115 may transmit a sidelink communication to the UE 115 via the communication link 135, and the other UE 115 may not successfully receive the sidelink communication. As such, the other UE 115 may transmit feedback information (e.g., a HARQ-NACK) to the UE 115 via the communication link 135. Upon receipt of the feedback information (e.g., a HARQ-NACK), the UE 115 may transmit feedback information (e.g., a HARQ-NACK) to the base station 105 via the communication link 125.

Figure 2:
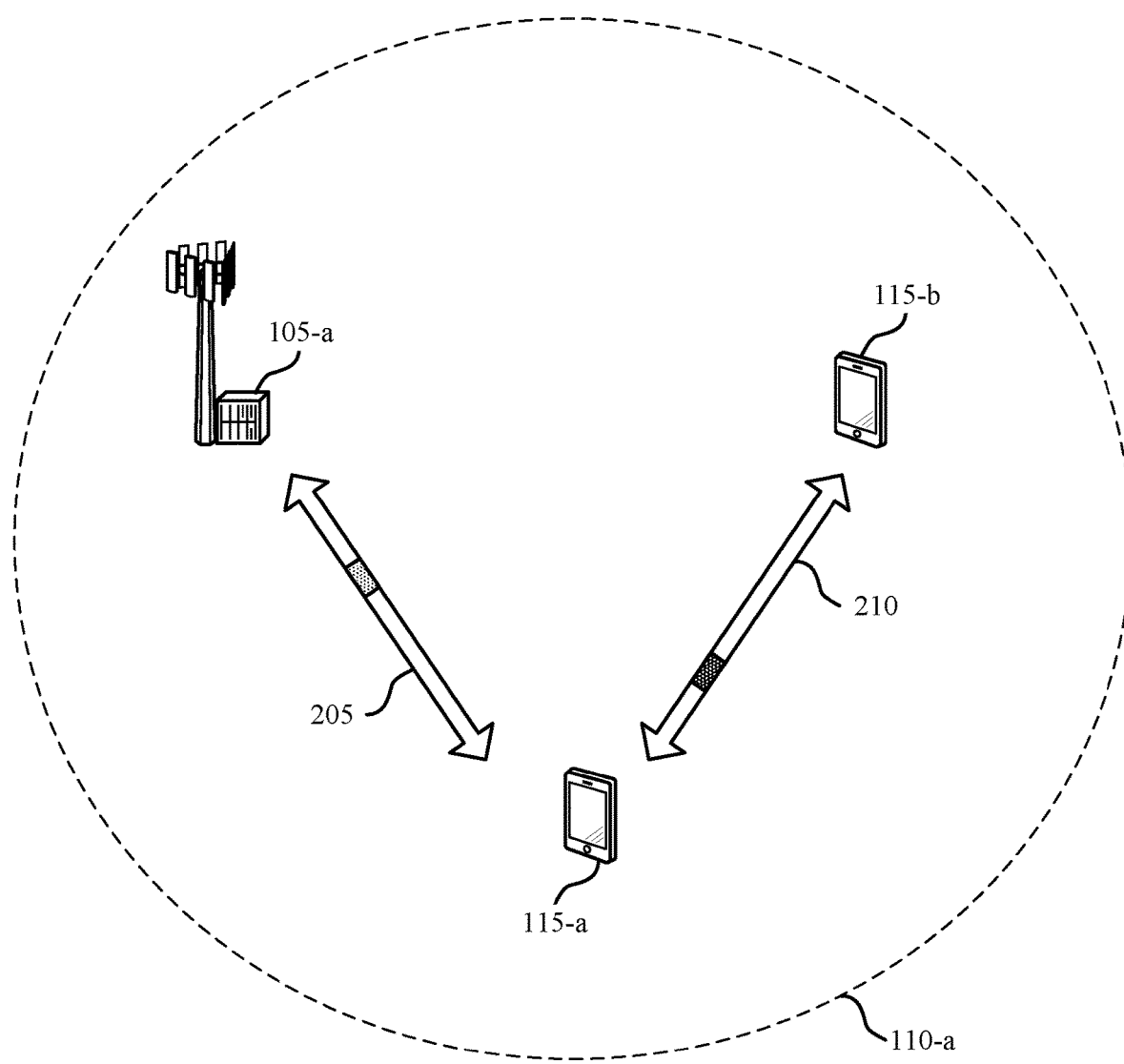

FIG. 2 illustrates an example of a wireless communications system 200 that supports HARQ feedback for sidelink in accordance with aspects of the present disclosure. The wireless communications system 200 may implement aspects of the wireless communications system 100 or may be implemented by aspects of the wireless communications system 100. For example, the wireless communications system 200 may include a base station 105-a, a UE 115-a, and a UE 115-b, which may be examples of a base station 105 as described with reference to FIG. 1. One or more of the base station 105 a, the UE 115-a, and the UE 115-b may communicate within a geographic coverage area 110 a over communication link 205 and a communication link 210, which may be examples of a geographic coverage area and a communication link as described with reference to FIG. 1.

The wireless communications system 200 may support multiple radio access technologies including 4G systems such as LTE systems, LTE-A systems, or LTE-A Pro systems, and 5G systems, which may be referred to as NR systems. The wireless communications system 200 may be an example of a V2X communications system, a V2V communications system, or a C-V2X communications system. The wireless communications system 200 may also affect power consumption, spectral efficiency, higher data rates and, in some examples, may promote enhanced efficiency for higher reliability and lower latency wireless communications (e.g., uplink transmission, downlink transmission, uplink reception, and downlink reception, sidelink transmission, sidelink reception).

The UE 115-a may communicate with the base station 105-a over the communication link 205. For example, the base station 105-a may transmit, and the UE 115-a may receive, grants that schedule wireless communication over the communication link 205 including sidelink communication over the communication link 210. Additionally or alternatively, the UE 115-a may communicate with the UE 115-b over the communication link 210 (e.g., a sidelink). For example, one or more of the UE 115-a or the UE 115-b may transmit or receive sidelink communication on one or more of a PSCCH or a PSSCH. In some cases, the UE 115-b may generate and transmit feedback information 215 (e.g., HARQ feedback information) to the UE 115-a. For example, the UE 115-b may transmit the feedback information 215 to the UE 115-a on a PSFCH. In some cases, the UE 115-a may transmit the feedback information 220 to the base station 105-a on a PUCCH.

In some cases, the UE 115-a may be configured to transmit the feedback information 220 to the base station 105-a on the PUCCH after a last sidelink occasion. For example, the base station 105-a may provide the UE 115-a with a grant that allocates multiple sidelink occasions. The UE 115-a may transmit a sidelink communication to the UE 115-b and receive feedback information 215 from the UE 115-b in response to the sidelink communication. The feedback information 215 may indicate that the sidelink communication was successful. However, the UE 115-a may wait to transmit feedback information 220 via a PUCCH to the base station 105-a until after all the sidelink occasions have concluded. In some cases, the UE 115-a may be unable to provide the base station 105-a with early feedback information 220, and subsequent sidelink occasions scheduled by the base station 105-a may be unused. Consequently, the base station 105-a may be unable to reallocate (e.g., to other UEs 115) unused sidelink resources in an efficient manner.

In the wireless communications system 200, the UE 115-a may transmit feedback information 220 to the base station 105-a in response to feedback information 215 from the UE 115-b indicating an ACK. For example, the UE 115-a may transmit feedback information 220 to the base station 105-a without waiting for pending sidelink occasions. For example, the UE 115-a may transmit feedback information 220 to the base station 105-a after receiving the feedback information 215 from the UE 115-b. That is, the UE 115-a may not wait until a last sidelink occasion has passed to transmit feedback information 220 to the base station 105-a. In some cases, the base station 105-a may indicate, in a DCI grant, a PUCCH resource for each respective sidelink occasion. The UE 115-a may transmit an ACK to the base station 105-a based on receiving an ACK from the UE 115-b over a PSFCH.

The UE 115-a may determine that pending sidelink occasions (e.g., PSSCH resources) and uplink resources (e.g., PUCCH resources) have been reclaimed by the base station 105-*a*. For example, the UE 115-*a* may not use the reclaimed resources. As such, the base station 105-*a* may allocate reclaimed sidelink resources to other UEs 115. Additionally or alternatively, scheduled sidelink occasions may terminate if a first sidelink transmission (e.g., a PSSCH transmission) is successful. For example, the base station 105-*a* may allocate three sidelink occasions to the UE 115-*a* (e.g., via a downlink grant). The UE 115-*a* may communicate with the UE 115-*b* via the communication link 210 during an initial sidelink occasion of a set of sidelink occasion. The UE 115-*b* may successfully receive a sidelink communication from the UE 115-*a* and the UE 115-*b* may transmit feedback information 215 (e.g., an ACK) to the UE 115-*a* over the communication link 210. The UE 115-*a* may transmit feedback information 220 (e.g., an ACK) to the base station 105-*a* over the communication link 205. The base station 105-*a* or the UE 115-*a* may terminate the remaining sidelink occasions. Additionally or alternatively, the base station 105-*a* may reclaim the sidelink occasions and allocate these sidelink occasions to other UEs 115.

In some cases, the UE 115-*a* may be configured to skip uplink feedback of negative acknowledgements (NACKs) (i.e., unsuccessful reception of a sidelink communication at the UE 115-*b*). For example, if the base station 105-*a* allocates multiple sidelink occasions to the UE 115-*a*, and a first sidelink transmission during a first sidelink occasion is unsuccessful, the UE 115-*a* may determine that transmitting the feedback information 220 (e.g., a NACK) to the base station 105-*a* is unnecessary since the base station 105-*a* has allocated additional sidelink occasions for the UE 115-*a*. However, in some cases, where a sidelink communication during a last sidelink occasion is unsuccessful, the UE 115-*a* may determine to transmit feedback information 220 (e.g., a NACK) to the base station 105-*b* because the base station 105-*b* may not have allocated any additional sidelink occasions for sidelink communication attempts. In some examples, NACK skipping may be useful for HARQ-ACK prioritization. A priority of a transport block (TB) for a sidelink communication may be higher than a priority of a TB for an uplink or downlink transmission (e.g., between the UE 115-*a* and the base station 105-*a*). In some cases, the UE 115-*a* may drop an uplink or downlink HARQ-ACK if the HARQ-ACK collides in time with a sidelink HARQ-ACK. In some cases, NACK skipping may prevent a HARQ-ACK from being dropped.

The base station 105-*a* may allocate uplink transmission resources via a DCI. For example, the base station 105-*a* may transmit a DCI to the UE 115-*a* via the communication link 205. The DCI may indicate uplink control channel resources for feedback messages related to the success or failure of sidelink communications between the UE 115-*a* and the UE 115-*b*. In some examples, a DCI may include a PUCCH resource indicator (PRI) and a PSFCH to HARQ feedback timing indicator (e.g., k1). In some other examples, the PSFCH to HARQ feedback timing indicator may indicate the PUCCH resource and the slot for reporting PUCCH feedback after a PSFCH/PSSCH occasion. In other examples, the base station 105-*a* may repurpose a DCI format (e.g., a format 3_x) to indicate uplink control channel resources for feedback messages. For example, the base station 105-*a* may utilize default fields (e.g., PRI and k1 fields) to indicate uplink control channel resources.

The base station 105-*a* may manage the timing (e.g., scheduling) of uplink and sidelink channel resources (e.g. PUCCH resources, PSSCH resources, PSFCH resources). For example, the base station 105-*a* may mange uplink channel resources for PUCCH feedback messages to be scheduled after a first sidelink occasion (e.g., for PSFCH transmissions) and before a second sidelink occasion (e.g., for PSSCH transmissions). Additionally, the UE 115-*a* may be configured to skip an uplink feedback transmission corresponding to a first sidelink transmission if the UE 115-*a* determines that the uplink occasion has been scheduled after a second sidelink transmission. For example, if a PUCCH occasion as determined by the k1 and the PRI associated with one or more of a PSSCH transmission or a PSFCH transmission are scheduled later in time than one or more of a subsequent PSSCH transmission or a subsequent PSFCH transmission, the UE 115-*a* may skip the PUCCH occasion. That is, even if the UE 115-*a* receives an ACK on a subsequent PSFCH transmission prior to the PUCCH occasion, the UE 115-*a* may wait for the subsequent PUCCH occasion to transmit an ACK to the base station 105-*a*. The timing may enable the base station 105-*a* to know the sidelink channel condition. For example, the base station 105-*a* may know that a TB is transmitted correctly using subsequent transmissions.

The various aspects of the above described techniques may apply to multiple sidelink feedback modes. For example, the base station 105-*a*, the UE 115-*a*, and the UE 115-*b* may operate according to a unicast sidelink feedback mode, a distance-based NACK feedback mode for sidelink groupcast, and a groupcast feedback mode with individual feedback. In some cases, for a distance-based groupcast mode, the UE 115-*a* may transmit an ACK to the base station 105-*a* if the UE 115-*a* does not receive a NACK from the UE 115-*b* in a respective PSFCH occasion. In some other cases, for a groupcast with individual feedback mode, the UE 115-*a* may transmit an ACK to the base station 105-*a* as soon as it receives an ACK from every UE in a group that the UE expects to receive a PSSCH transmission from.

Figure 3:
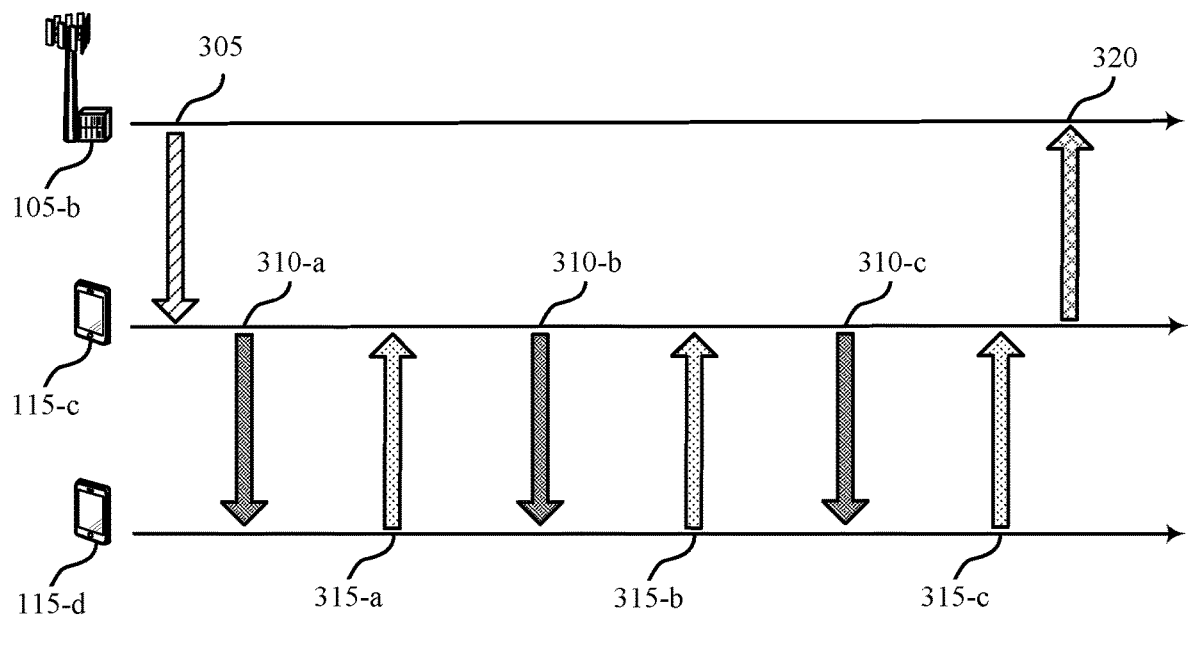
FIGS. 3 and 4 illustrate example of timelines that support HARQ feedback for sidelink in accordance with aspects of the present disclosure.
Figure 3:
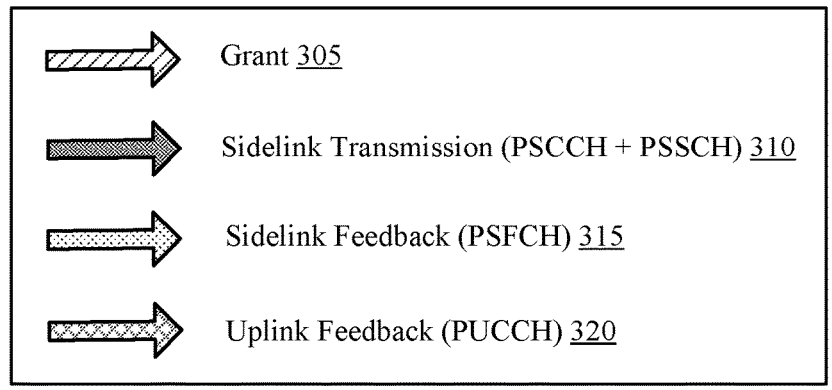

FIG. 3 illustrates an example of a timeline 300 that supports HARQ feedback for sidelink in accordance with aspects of the present disclosure. In some cases, the timeline 300 may implement aspects of the wireless communication system 100 and the wireless communications system 200. The timeline 300 may be implemented by one or more of a base station 105-*b*, a UE 115 *c*, or a UE 115-*d*, which may be examples of a base station 105 and UEs 115 as described with reference to FIG. 1. In the following description of the timeline 300, the operations between one or more of the base station 105-*b*, the UE 115 *c*, or the UE 115-*d* may be performed in a different order than the example order shown, or the operations performed by one or more of the base station 105-*b*, the UE 115 *c*, or the UE 115-*d* may be performed at different times. Some operations may also be omitted from the timeline 300, and other operations may be added to the timeline 300.

In the example of FIG. 3, the base station 105-*b* may transmit a grant 305 to the UE 115-*c*. For example, the base station 105-*b* may transmit, to the UE 115-*c*, a DCI carrying the grant 305. The grant 305 may allocate resources for sidelink communication with one or more other UEs (e.g., the UE 115-*d*). The UE 115-*c* may communicate with the UE 115-*d* using resources for sidelink communications allocated in the grant 305 by the base station 105-*b*. In some cases, the base station 105-*b* may allocate multiple sidelink occasions in the grant 305. For example, the base station 105-*b* may allocate three sidelink occasions to the UE 115-*c*. The UE 115-*c* may communicate with the UE 115-*d* during one or more of the sidelink occasions. For example, the UE 115-*c* may transmit a sidelink transmission 310 to the UE 115-*d* during one or more of the sidelink occasions allocated by the base station 105-*b*. A sidelink transmission 310 may occur over one or more of a PSCCH or a PSSCH.

The UE 115-*c* may be configured to provide uplink feedback 320 to the base station 105-*b*. The UE 115-*c* may transmit, to the base station 105-*b*, the uplink feedback 320 on a PUCCH. In some cases, the UE 115-*c* may generate and transmit the uplink feedback 320 after a last sidelink occasion. For example, the UE 115-*c* may transmit a respective sidelink transmission 310 to the UE 115-*d* and receive respective sidelink feedback 315 from the UE 115-*d* in response to the respective sidelink transmission 310. The respective sidelink feedback 315 may indicate that the respective sidelink transmission 310 was successful.

In some cases, however, the UE 115-*c* may delay transmitting the uplink feedback 320 to the base station 105-*b* until after a last sidelink occasion (e.g., a sidelink occasion associated with a sidelink transmission 310-*c*). In some cases, the UE 115-*c* may be unable to provide the base station 105-*b* with early feedback, and subsequent sidelink resources scheduled by the base station 105-*b* may be unused. For example, the UE 115-*c* may not transmit one or more of a sidelink transmission 310-*b* or a sidelink transmission 310-*c*. However, the base station 105-*b* may be unable to reallocate (e.g., to other UEs) unused sidelink resources associated one or more of the sidelink transmission 310-*b* or a sidelink transmission 310-*c* in an efficient manner.

Figure 4:
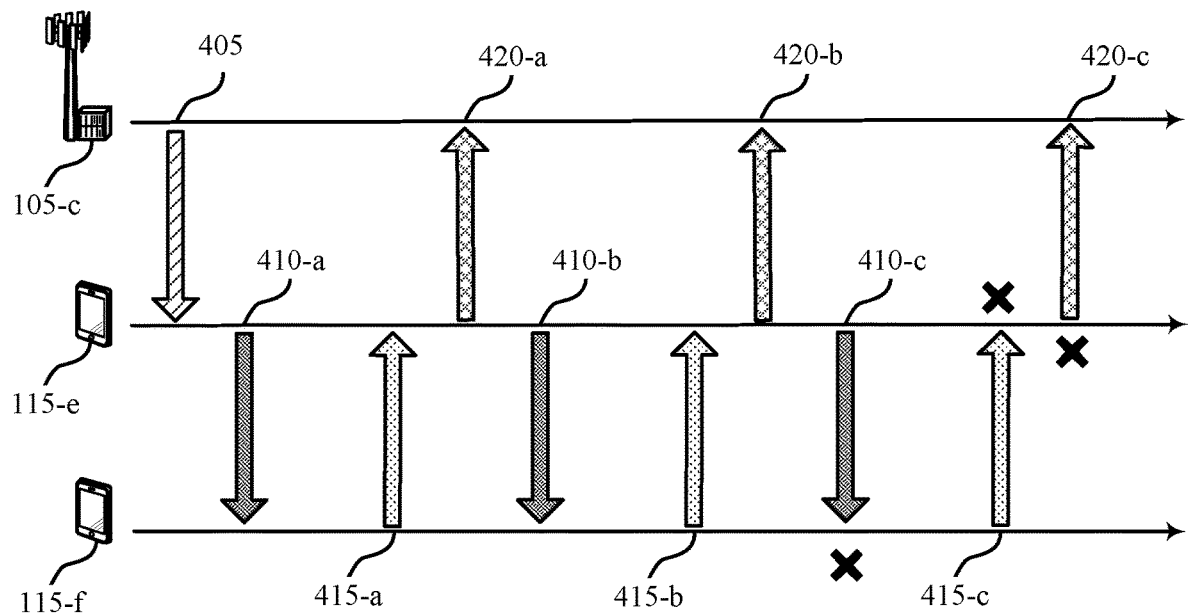
Figure 4:
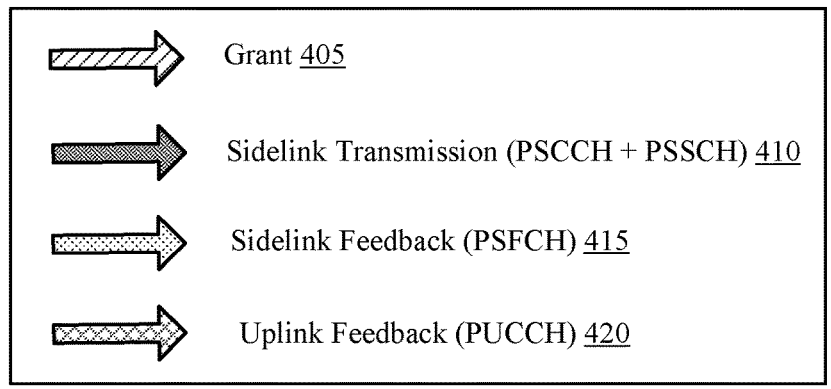

FIG. 4 illustrates an example of a timeline 400 that supports HARQ feedback for sidelink in accordance with aspects of the present disclosure. In some cases, the timeline 400 may implement aspects of the wireless communication system 100 and the wireless communications system 200. The timeline 400 may be implemented by one or more of a base station 105-*c*, a UE 115-*e*, or a UE 115-*f*, which may be examples of a base station 105 and UEs 115 as described with reference to FIG. 1. In the following description of the timeline 400, the operations between one or more of the base station 105-*c*, the UE 115-*e*, or the UE 115-*f* may be performed in a different order than the example order shown, or the operations performed by one or more of the base station 105-*c*, the UE 115-*e*, or the UE 115-*f* may be performed at different times. Some operations may also be omitted from the timeline 400, and other operations may be added to the timeline 400.

In the example of FIG. 4, the base station 105-*c* may transmit a grant 405 to the UE 115-*e*. For example, the base station 105-*c* may transmit, to the UE 115-*e*, a DCI carrying the grant 405. The grant 405 may allocate resources for sidelink communication with the UE 115-*f*. In some examples, the grant 405 may be a dynamic grant (e.g., via a DCI) or a configured grant (e.g., via an RRC message). One or more of the dynamic grant or the configured grant may allocate one or more resources for one or more of a sidelink transmission 410 (e.g., one or more of a sidelink transmission 410-*a*, a sidelink transmission 410-*b*, or a sidelink transmission 410-*c*), a sidelink feedback 415 (e.g., a sidelink feedback 415-*a*, a sidelink feedback 415-*b*, or a sidelink feedback 415-*c*), or an uplink feedback 420 (e.g., an uplink feedback 420-*a*, an uplink feedback 420-*b*, or an uplink feedback 420-*c*).

The base station 105-*c* may for a configured grant (e.g., either a type 1 or a type 2 configured grant), allocate a sequence of resources with a given periodicity. For each period of the given periodicity, the base station 105-*c* may allocate up to a number of resources (e.g., up to 3 resources) for one or more of a PSSCH, a PSFCH, or a PUCCH. In some examples, when the grant 405 is a configured grant, the sidelink transmissions 410, the sidelink feedbacks 415, and the uplink feedbacks 420 may correspond to transmission occasion within a period of the configured grant. In some cases, the base station 105-*c* may allocate resources for multiple periods in the manner described above. For example, the base station 105-*c* may allocate up to three resources (e.g., PUCCH resources) for HARQ-ACK feedback within a first period. Additionally or alternatively, the base station 105-*c* may allocate up to three resources (e.g., PUCCH resources) for HARQ-ACK feedback within a second (e.g., a subsequent) period, and so forth.

In some cases, within a first period, the UE 115-*e* may receive the sidelink feedback 415-*a* from the UE 115-*f*. In response to the sidelink feedback 415-*a*, the UE 115-*e* may transmit the uplink feedback 420-*a* (e.g., an ACK) to the base station 105-*c*. In some cases, within the first period, the base station 105-*c* may receive the uplink feedback 420-*a* (e.g., an early ACK) and may treat resources for the sidelink transmission 410-*b*, the sidelink transmission 410-*c*, the sidelink feedback 415 *b*, the sidelink feedback 415-*c*, the uplink feedback 420-*b*, and the uplink feedback 420-*c* as available to reschedule to other UEs. However, the base station 105-*c* may not handle resources within subsequent periods (e.g., for a second period and so forth) as available to reschedule to other UEs. The base station 105-*c* may handle resources corresponding to subsequent periods as allocated to the UE 115-*e*. For example, the base station 105-*c* may treat resources corresponding to subsequent periods as allocated to the UE 115-*e* until the base station 105-*c* receives an ACK in a subsequent period. Similarly, the UE 115-*e* may treat resources in a subsequent period as reclaimed by the base station 105-*c* if the UE 115-*e* transmits an ACK to the base station 105-*e* in the subsequent period.

In some cases, the base station 105-*c* may repurpose a DCI format (e.g., format 3_x) to indicate uplink control channel resources for uplink feedback 420. For example, the base station 105-*c* may use default fields (e.g., PRI and k1 fields) in the DCI to indicate uplink control channel resources. In some cases, where the grant 405 is a type 1 configured grant, the base station 105-*c* may configure uplink control channel resources for the uplink feedback 420 in each period corresponding to the configured grant. In some cases, the base station 105-*c* may use default fields in the DCI according to one of multiple options. For example, according to a first option (e.g., option 1), the DCI format may include up to three PRIs and up to three feedback timing fields indicating the PUCCH resources and feedback timing for each of the PUCCH channels (e.g., corresponding to the uplink feedback 420). In some other examples, according to a second option (e.g., option 2), the DCI format may include one PRI field and one feedback timing field (e.g., as in the legacy DCI format 3_0). The UE 115-*e* may interpret that the same PUCCH resource ID (e.g., in different slots) is used for the three PUCCH resources (e.g., corresponding to the uplink feedback 420). Additionally or alternatively, the UE 115-*e* may determine that the timing gaps between each PUCCH occasion and corresponding PSFCH occasion are the same as indicated by the feedback timing field.

The UE 115-*e* may communicate with the UE 115-*f* using resources for sidelink communications allocated in the grant 405 by the base station 105-*c*. In some cases, the base station 105-*c* may allocate multiple sidelink occasions in the grant 405. For example, the base station 105-*c* may allocate three sidelink occasions to the UE 115-*e*. The UE 115-*e* may communicate with the UE 115-*f* during one or more of the sidelink occasions. For example, the UE 115-*e* may transmit a sidelink transmission 410 (e.g., one or more of a sidelink transmission 410-a, a sidelink transmission 410-b, or a sidelink transmission 410-c) to the UE 115-f during one or more of the sidelink occasions allocated by the base station 105-c. A sidelink transmission 410 may occur over one or more of a PSCCH or a PSSCH.

The UE 115-e may transmit uplink feedback 420 to the base station 105-c in response to a sidelink feedback 415 from the UE 115-f indicating an ACK or a NACK. In some cases, the UE 115-e may transmit early uplink feedback (e.g., an uplink feedback 420-a, an uplink feedback 420-b) to the base station 105-c without waiting for pending sidelink occasions. For example, the sidelink feedback 415-b may indicate an ACK associated with the sidelink transmission 410-b. The UE 115-e may then transmit the uplink feedback 420-b to the base station 105-c. The UE 115-e may determine that pending sidelink occasions and resources have been reclaimed by the base station 105-c. As such, the base station 105-c may allocate reclaimed sidelink resources to other UEs. In some cases, the UE 115-e may transmit uplink feedback 420 on a PUCCH.

The UE 115-e may be configured to skip an uplink feedback 420 related to negative acknowledgements (e.g., NACKs). For example, if the base station 105-c allocates multiple sidelink occasions to the UE 115-e, and the sidelink transmission 410-a during a first sidelink occasion is unsuccessful based on a sidelink feedback 415-a, the UE 115-e may determine that transmitting the uplink feedback 420-a (e.g., a NACK) to the base station 105-c is unnecessary since the base station 105-c has already allocated additional sidelink resources to the UE 115-e. However, in some cases, where a sidelink transmission 410-c during a last allocated sidelink occasion is unsuccessful, the UE 115-e may determine to transmit uplink feedback 420-c (e.g., a NACK) to the base station 105-c, in response to a sidelink feedback 415-c, since the base station 105-c may not have allocated any additional sidelink resources for further sidelink transmissions 410.

In some cases, the base station 105-c may manage the timing (e.g., scheduling) of uplink and sidelink channel resources. For example, the base station 105-c may control scheduling of uplink channel resources for the uplink feedback 420 to occur after a first sidelink occasion and before a second sidelink occasion. Additionally, the UE 115-e may be configured to skip an uplink feedback transmission (e.g., the uplink feedback 420-a) corresponding to a first sidelink transmission, if the UE 115-e determines that the uplink occasion has been scheduled after a second sidelink transmission (e.g. a sidelink transmission 410-b). In some cases, the base station 105-c may configure a gap (e.g., of a minimum duration) to exist between a respective uplink feedback 420 (e.g., PUCCH feedback) and a respective sidelink feedback 415 (e.g., PSFCH transmissions). In some cases, the base station 105-c may configure a gap to exist between a respective uplink feedback 420 and a respective sidelink feedback 415, such that the UE 115-e may be able to process feedback received on the PSFCH before generating and transmitting HARQ-ACK feedback on a corresponding PUCCH.

Figure 5:
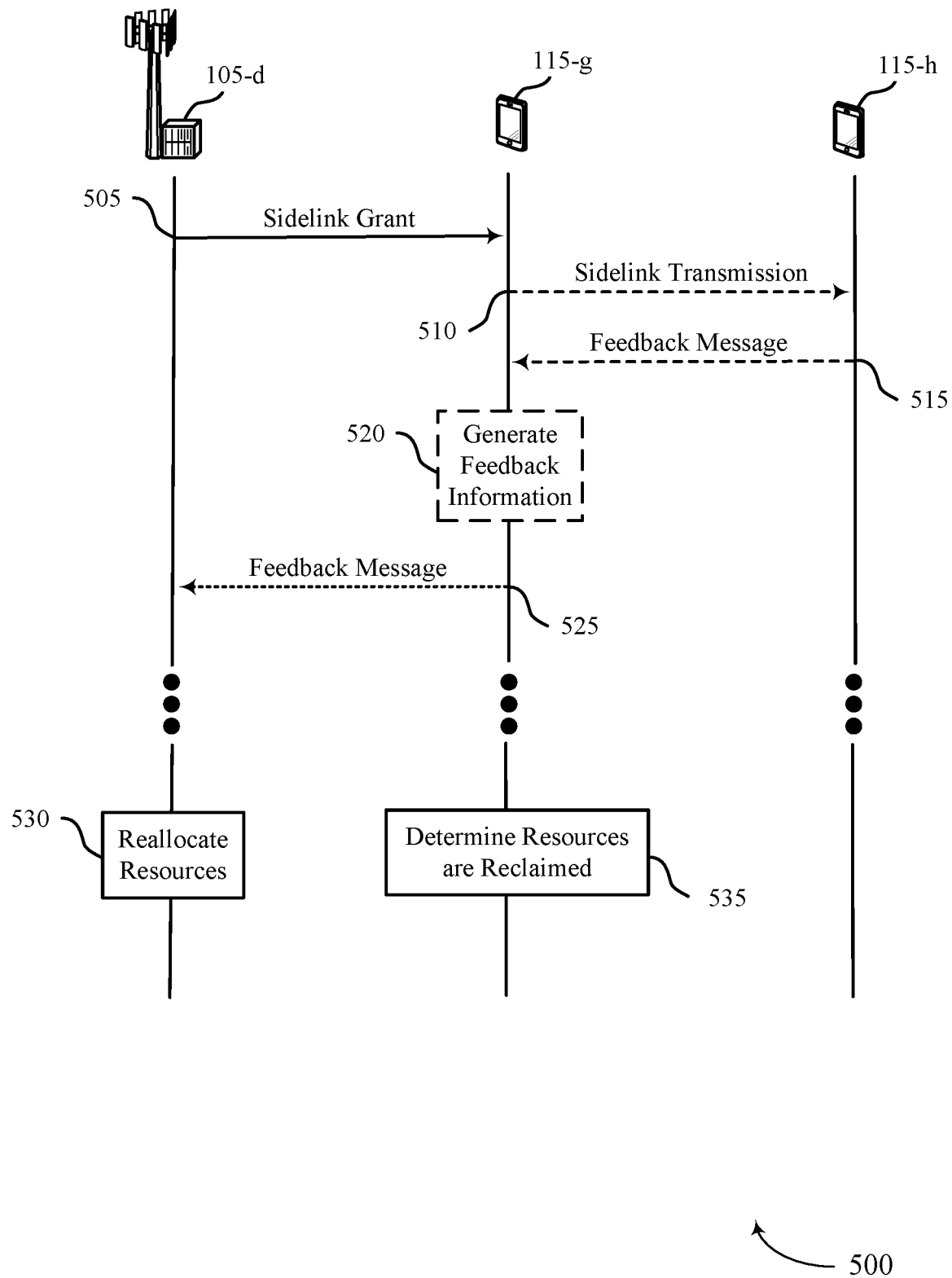
FIG. 5 illustrates an example of a process flow that supports HARQ feedback for sidelink in accordance with aspects of the present disclosure.

FIG. 5 illustrates an example of a process flow 500 that supports HARQ feedback for sidelink in accordance with aspects of the present disclosure. The process flow 500 may implement aspects of the wireless communications systems 100 and 200 or may be implemented by aspects of the wireless communications systems 100 and 200 as described with reference to FIGS. 1 and 2. For example, the process flow 500 may implement or be implemented by a base station 105-d, a UE 115-g, and a UE 115-h. In the following description of the process flow 500, the operations between the base station 105-d, the UE 115-g, and the UE 115-h may be performed in a different order than the example order shown, or the operations performed by the base station 105-d, the UE 115-g, and the UE 115-h may be performed at different times. Some operations may also be omitted from the process flow 500, and other operations may be added to the process flow 500.

At 505, the base station 105-d may transmit, to the UE 115-g, a grant that schedules a plurality of sidelink occasions associated with sidelink communication from the UE 115-g, and that indicates a plurality of uplink occasions for indicating feedback associated with the sidelink communication. For example, the base station 105-d may transmit, to the UE 115-g, a DCI message carrying the grant. At 510, the UE 115-g may transmit, to the UE 115-h, a sidelink message during a sidelink occasion of the plurality of sidelink occasions. For example, the UE 115-g may transmit a sidelink message to the UE 115-h on one or more of a PSCCH or a PSSCH over a sidelink. At 515, the UE 115-g may receive, from the UE 115-h, a sidelink feedback message during a sidelink feedback occasion associated with the sidelink occasion. The feedback message may be based on the transmitted sidelink message. For example, the UE 115-g may receive a PSFCH message from the UE 115-h.

At 520, the UE 115-g may generate feedback information based on the transmitted sidelink message. The feedback information may include an acknowledgement (e.g., an ACK) or a negative acknowledgment (e.g., a NACK) associated with the sidelink message. At 525, the UE 115-g may transmit, to the base station 105-d, an uplink feedback message including the feedback information during an uplink occasion of the plurality of uplink occasions. For example, the UE 115-g may transmit a PUCCH message to the base station 105-d during an uplink occasion of the plurality of uplink occasions. The feedback information may include an indication of the ACK or the NACK. In some examples, the uplink occasion may be an uplink occasion other than a last uplink occasion of the plurality of uplink occasions. As such, the UE 115-g may support early HARQ feedback when the feedback information is an ACK. In some other examples, the uplink occasion may be a last uplink occasion of the plurality of uplink occasions, for example, when the feedback information is a NACK.

At 530, the base station 105-d may identify one or more sidelink resources associated with one or more subsequent sidelink occasions of the plurality of sidelink occasions as unavailable sidelink resources based on the feedback information including the ACK. For example, the base station 105-d may receive a PUCCH message from the UE 115-g including an ACK and may reallocate one or more sidelink resources associated with one or more subsequent sidelink occasions of the plurality of sidelink occasions. At 535, the UE 115-g may identify one or more uplink resources associated with one or more subsequent uplink occasions of the plurality of uplink occasions as unavailable uplink resources based on the feedback information comprising the ACK. For example, the UE 115-g may transmit a PUCCH message including an ACK to the base station 105-d and may determine that one or more subsequent uplink occasions are reclaimed.

Figure 6:
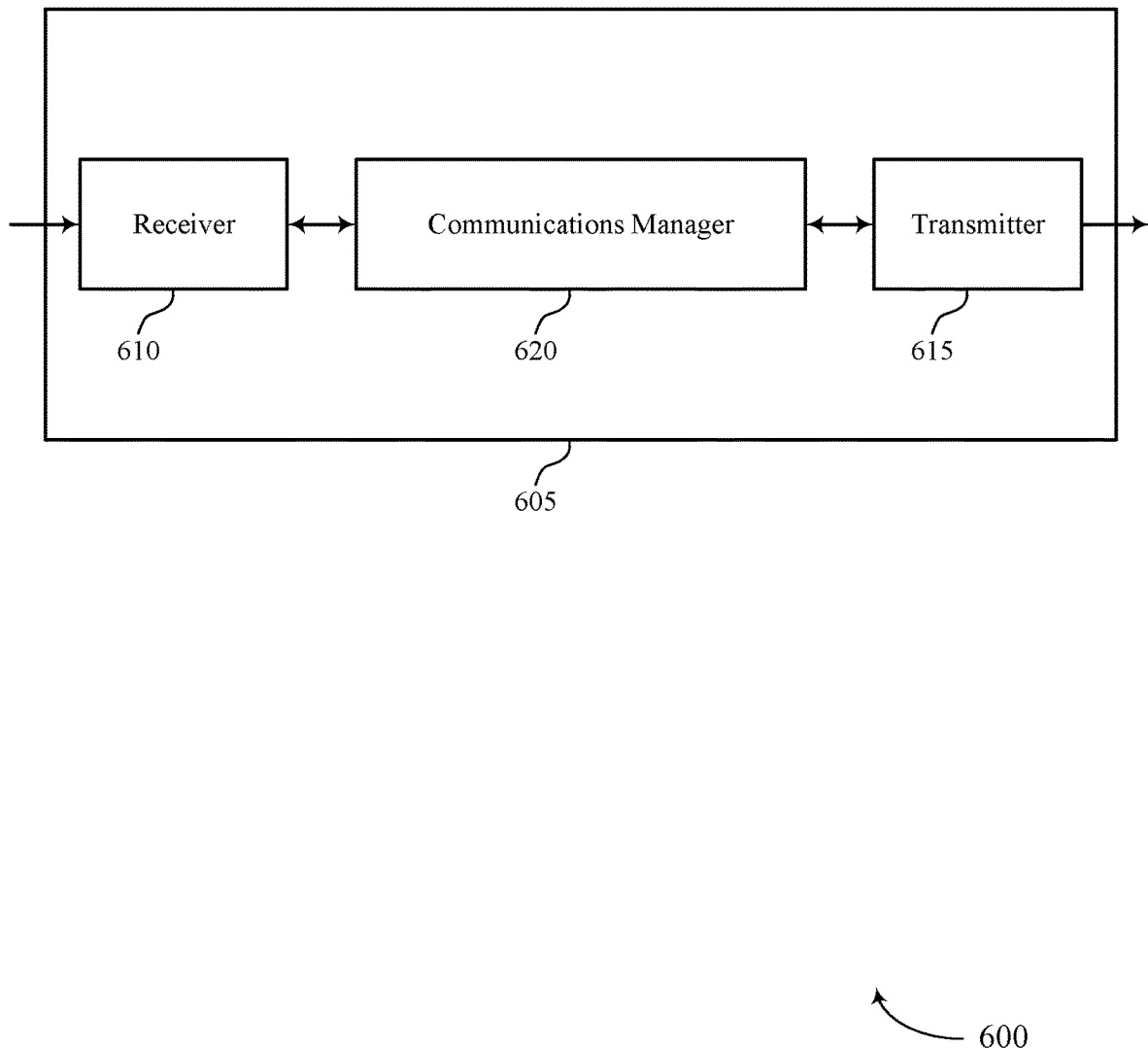
FIGS. 6 and 7 show block diagrams of devices that support HARQ feedback for sidelink in accordance with aspects of the present disclosure.

FIG. 6 shows a block diagram 600 of a device 605 that supports HARQ feedback for sidelink in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to HARQ feedback for sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to HARQ feedback for sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of HARQ feedback for sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving a grant that schedules a set of multiple sidelink occasions associated with sidelink communication from the first UE, and that indicates a set of multiple uplink occasions for indicating feedback associated with the sidelink communication. The communications manager 620 may be configured as or otherwise support a means for transmitting a sidelink message during a sidelink occasion of the set of multiple sidelink occasions. The communications manager 620 may be configured as or otherwise support a means for generating feedback information based on the transmitted sidelink message, the feedback information including an ACK or a NACK associated with the sidelink message. The communications manager 620 may be configured as or otherwise support a means for transmitting an uplink feedback message including the feedback information during an uplink occasion of the set of multiple uplink occasions, the feedback information including an indication of the ACK or the NACK.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
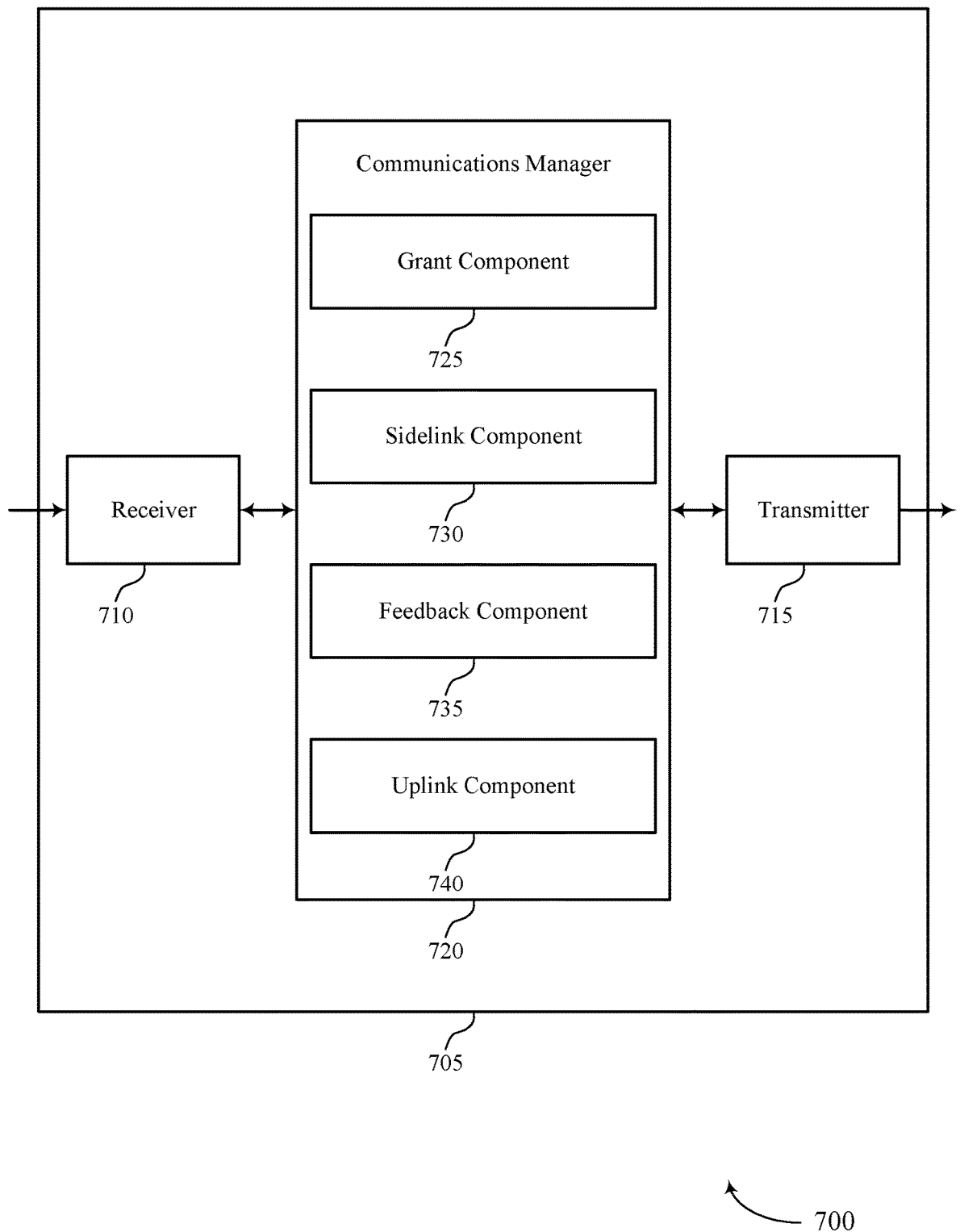

FIG. 7 shows a block diagram 700 of a device 705 that supports HARQ feedback for sidelink in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to HARQ feedback for sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to HARQ feedback for sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of HARQ feedback for sidelink as described herein. For example, the communications manager 720 may include a grant component 725, a sidelink component 730, a feedback component 735, an uplink component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The grant component 725 may be configured as or otherwise support a means for receiving a grant that schedules a set of multiple sidelink occasions associated with sidelink communication from the first UE, and that indicates a set of multiple uplink occasions for indicating feedback associated with the sidelink communication. The sidelink component 730 may be configured as or otherwise support a means for transmitting a sidelink message during a sidelink occasion of the set of multiple sidelink occasions. The feedback component 735 may be configured as or otherwise support a means for generating feedback information based on the transmitted sidelink message, the feedback information including an ACK or a NACK associated with the sidelink message. The uplink component 740 may be configured as or otherwise support a means for transmitting an uplink feedback message including the feedback information during an uplink occasion of the set of multiple uplink occasions, the feedback information including an indication of the ACK or the NACK.

Figure 8:
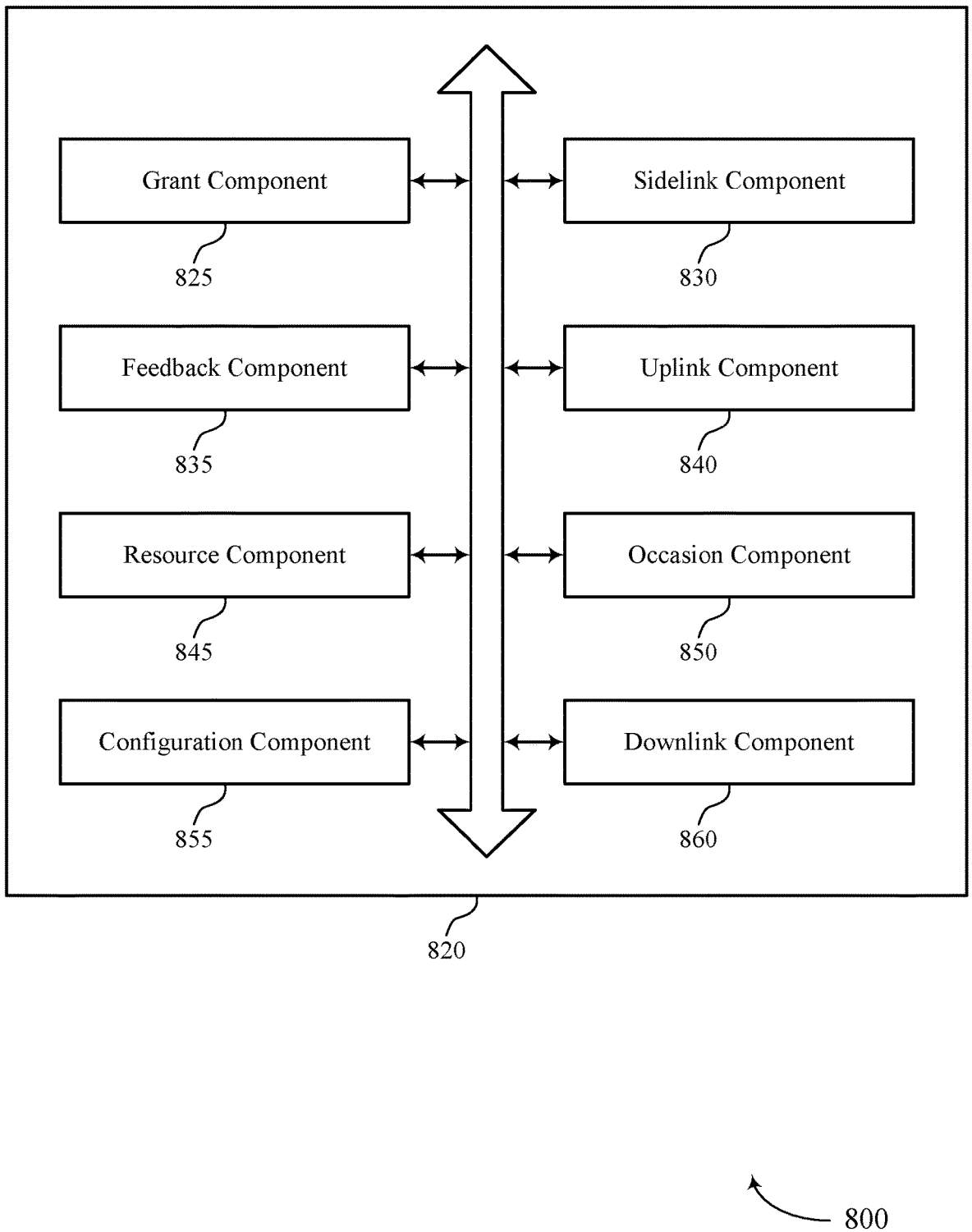
FIG. 8 shows a block diagram of a communications manager that supports HARQ feedback for sidelink in accordance with aspects of the present disclosure.

FIG. 8 shows a block diagram 800 of a communications manager 820 that supports HARQ feedback for sidelink in accordance with aspects of the present disclosure. The communications manager 820 may be an example of aspects of a communications manager 620, a communications manager 720, or both, as described herein. The communications manager 820, or various components thereof, may be an example of means for performing various aspects of HARQ feedback for sidelink as described herein. For example, the communications manager 820 may include a grant component 825, a sidelink component 830, a feedback component 835, an uplink component 840, a resource component 845, an occasion component 850, a configuration component 855, a downlink component 860, or any combination thereof. Each of these components may communicate, directly or indirectly, with one another (e.g., via one or more buses).

The communications manager 820 may support wireless communication at a first UE in accordance with examples as disclosed herein. The grant component 825 may be configured as or otherwise support a means for receiving a grant that schedules a set of multiple sidelink occasions associated with sidelink communication from the first UE, and that indicates a set of multiple uplink occasions for indicating feedback associated with the sidelink communication. The sidelink component 830 may be configured as or otherwise support a means for transmitting a sidelink message during a sidelink occasion of the set of multiple sidelink occasions. The feedback component 835 may be configured as or otherwise support a means for generating feedback information based on the transmitted sidelink message, the feedback information including an ACK or a NACK associated with the sidelink message. The uplink component 840 may be configured as or otherwise support a means for transmitting an uplink feedback message including the feedback information during an uplink occasion of the set of multiple uplink occasions, the feedback information including an indication of the ACK or the NACK.

In some examples, the feedback component 835 may be configured as or otherwise support a means for receiving a sidelink feedback message during a sidelink feedback occasion associated with the sidelink occasion based on the transmitted sidelink message. In some examples, the feedback component 835 may be configured as or otherwise support a means for generating the feedback information based on the sidelink feedback message including the ACK. In some examples, the uplink component 840 may be configured as or otherwise support a means for transmitting the uplink feedback message including the feedback information during the uplink occasion of the set of multiple uplink occasions based on the sidelink feedback message including the ACK, the uplink occasion including an uplink occasion other than a last uplink occasion of the set of multiple uplink occasions. In some examples, the feedback component 835 may be configured as or otherwise support a means for generating the feedback information based on an absence of a sidelink feedback message during a sidelink feedback occasion associated with the sidelink occasion based on the transmitted sidelink message.

In some examples, the resource component 845 may be configured as or otherwise support a means for identifying one or more sidelink resources associated with one or more subsequent sidelink occasions of the set of multiple sidelink occasions as unavailable sidelink resources based on the feedback information including the ACK. In some examples, the resource component 845 may be configured as or otherwise support a means for identifying one or more uplink resources associated with one or more subsequent uplink occasions of the set of multiple uplink occasions as unavailable uplink resources based on the feedback information including the ACK. In some examples, the feedback component 835 may be configured as or otherwise support a means for receiving a sidelink feedback message during a sidelink feedback occasion associated with the sidelink occasion based on the transmitted sidelink message. In some examples, the feedback component 835 may be configured as or otherwise support a means for generating the feedback information based on the sidelink feedback message including the NACK.

In some examples, the uplink component 840 may be configured as or otherwise support a means for refraining from transmitting the uplink feedback message including the feedback information during the uplink occasion of the set of multiple uplink occasions based on the sidelink feedback message including the NACK. In some examples, the resource component 845 may be configured as or otherwise support a means for identifying one or more sidelink resources associated with one or more subsequent sidelink occasions of the set of multiple sidelink occasions as available sidelink resources based on the sidelink feedback message including the ACK. In some examples, the resource component 845 may be configured as or otherwise support a means for identifying one or more uplink resources associated with one or more subsequent uplink occasions of the set of multiple uplink occasions as available uplink resources based on the sidelink feedback message including the NACK. In some examples, refraining from transmitting the uplink feedback message including the feedback information during the uplink occasion of the set of multiple uplink occasions is based on that the sidelink feedback message includes the NACK and that the uplink occasion includes an uplink occasion other than a last uplink occasion of the set of multiple uplink occasions.

In some examples, the occasion component 850 may be configured as or otherwise support a means for determining that the uplink occasion of the set of multiple uplink occasions includes a last uplink occasion of the set of multiple uplink occasions. In some examples, the uplink component 840 may be configured as or otherwise support a means for transmitting the uplink feedback message including the feedback information during the last uplink occasion of the set of multiple uplink occasions based on the feedback information including the NACK and that the uplink occasion includes the last uplink occasion of the set of multiple uplink occasions.

In some examples, the configuration component 855 may be configured as or otherwise support a means for receiving control signaling indicating a feedback reporting configuration. In some examples, the uplink component 840 may be configured as or otherwise support a means for transmitting the uplink feedback message during the uplink occasion of the set of multiple uplink occasions based on the feedback reporting configuration. In some examples, the downlink component 860 may be configured as or otherwise support a means for receiving a DCI indicating the grant that schedules the set of multiple sidelink occasions associated with the sidelink communication from the first UE to a second UE or a group of UEs, and that indicates the set of multiple uplink occasions for indicating the feedback information associated with the sidelink communication.

In some examples, the occasion component 850 may be configured as or otherwise support a means for determining the uplink occasion of the set of multiple uplink occasions based on an uplink resource indicator associated with the DCI. In some examples, the occasion component 850 may be configured as or otherwise support a means for determining the sidelink occasion of the set of multiple sidelink occasions based on a feedback timing indicator associated with the DCI. In some examples, the occasion component 850 may be configured as or otherwise support a means for determining that the sidelink occasion corresponds to the uplink occasion based on one or more of the uplink resource indicator or the feedback timing indicator. In some examples, the uplink component 840 may be configured as or otherwise support a means for transmitting the uplink feedback message including the feedback information during the uplink occasion of the set of multiple uplink occasions based on determining that the sidelink occasion corresponds to the uplink occasion.

In some examples, the uplink resource indicator includes a PRI. In some examples, the sidelink occasions are associated with a same transport block. In some examples, the feedback timing indicator includes a HARQ feedback timing indicator identifying a duration between a sidelink feedback message and the uplink feedback message, the sidelink feedback message corresponding to a PSFCH transmission and the uplink feedback message corresponding to a PUCCH transmission. In some examples, each respective sidelink occasion of the set of multiple sidelink occasions corresponds to each respective uplink occasion of the set of multiple uplink occasions. In some examples, each respective sidelink occasion of the set of multiple sidelink occasions occurs before each respective uplink occasion of the set of multiple uplink occasions. In some examples, the grant schedules the transmitting of the uplink feedback message to occur after receiving of a sidelink feedback message and before transmitting a second sidelink message. In some other examples, the grant schedules the transmitting of the uplink feedback message to occur after monitoring for a sidelink feedback message and before transmitting a second sidelink message. A gap (e.g., a duration) between the monitoring for the sidelink feedback message and the transmitting of the uplink feedback message satisfies a threshold (e.g., is greater than a threshold).

In some examples, the uplink component 840 may be configured as or otherwise support a means for transmitting the uplink feedback message after a second sidelink occasion of the set of multiple sidelink occasions based on the second sidelink occasion of the set of multiple sidelink occasions being scheduled before the uplink occasion of the set of multiple uplink occasions. In some examples, the sidelink message corresponds to one or more of a PSCCH transmission or a PSSCH transmission, and a sidelink feedback message corresponds to a PSFCH transmission. In some examples, the set of multiple sidelink occasions includes one or more PSCCH occasions or one or more PSSCH occasions, and the set of multiple uplink occasions includes one or more PUCCH occasions.

Figure 9:
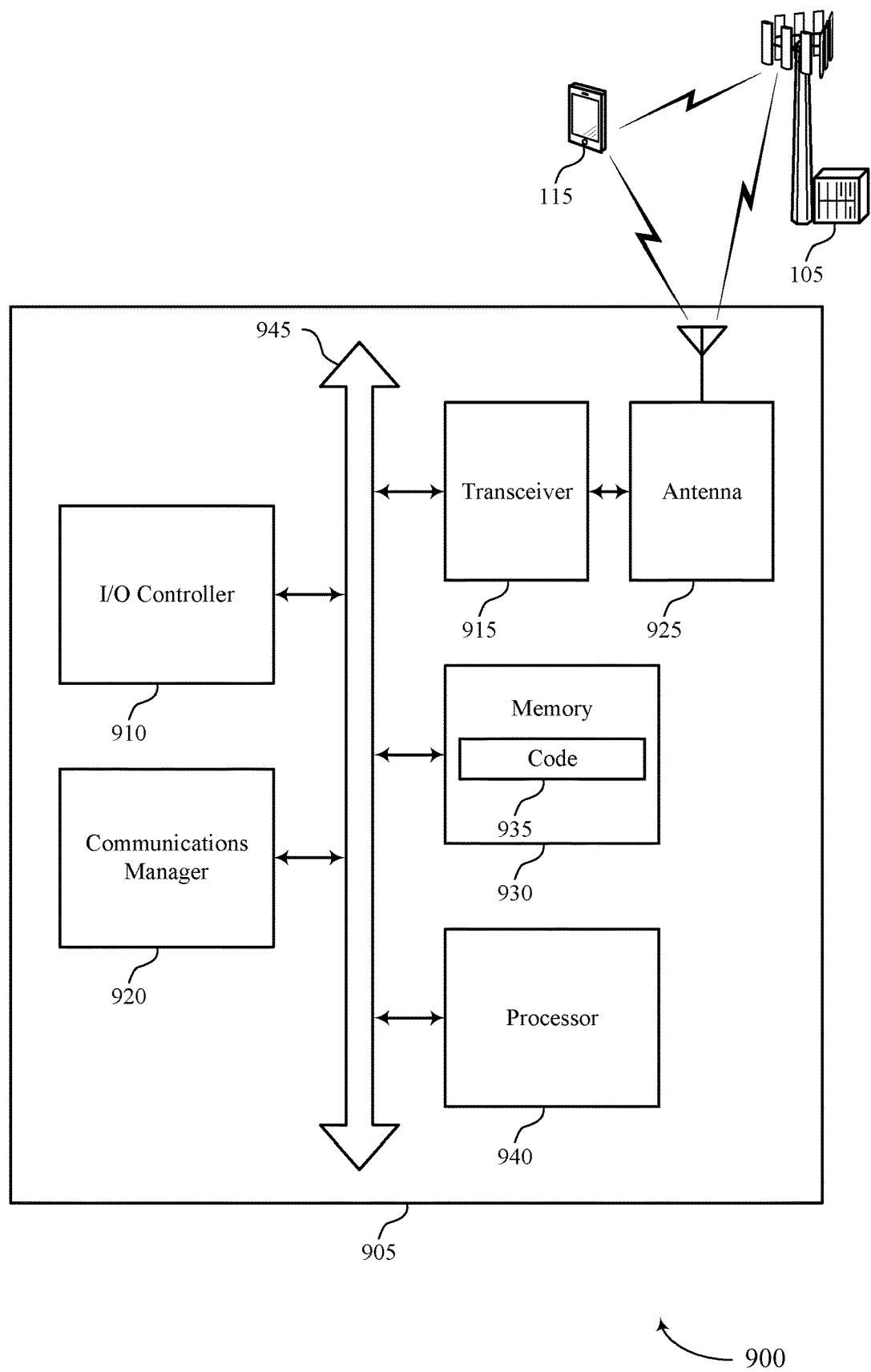
FIG. 9 shows a diagram of a system including a device that supports HARQ feedback for sidelink in accordance with aspects of the present disclosure.

FIG. 9 shows a diagram of a system 900 including a device 905 that supports HARQ feedback for sidelink in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting HARQ feedback for sidelink). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving a grant that schedules a set of multiple sidelink occasions associated with sidelink communication from the first UE, and that indicates a set of multiple uplink occasions for indicating feedback associated with the sidelink communication. The communications manager 920 may be configured as or otherwise support a means for transmitting a sidelink message during a sidelink occasion of the set of multiple sidelink occasions. The communications manager 920 may be configured as or otherwise support a means for generating feedback information based on the transmitted sidelink message, the feedback information including an ACK or a NACK associated with the sidelink message. The communications manager 920 may be configured as or otherwise support a means for transmitting an uplink feedback message including the feedback information during an uplink occasion of the set of multiple uplink occasions, the feedback information including an indication of the ACK or the NACK.

By including or configuring the communications manager 920 in accordance with examples as described herein, the device 905 may support techniques for reduced latency, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of HARQ feedback for sidelink as described herein, or the processor 940 and the memory 930 may be otherwise configured to perform or support such operations.

Figure 10:
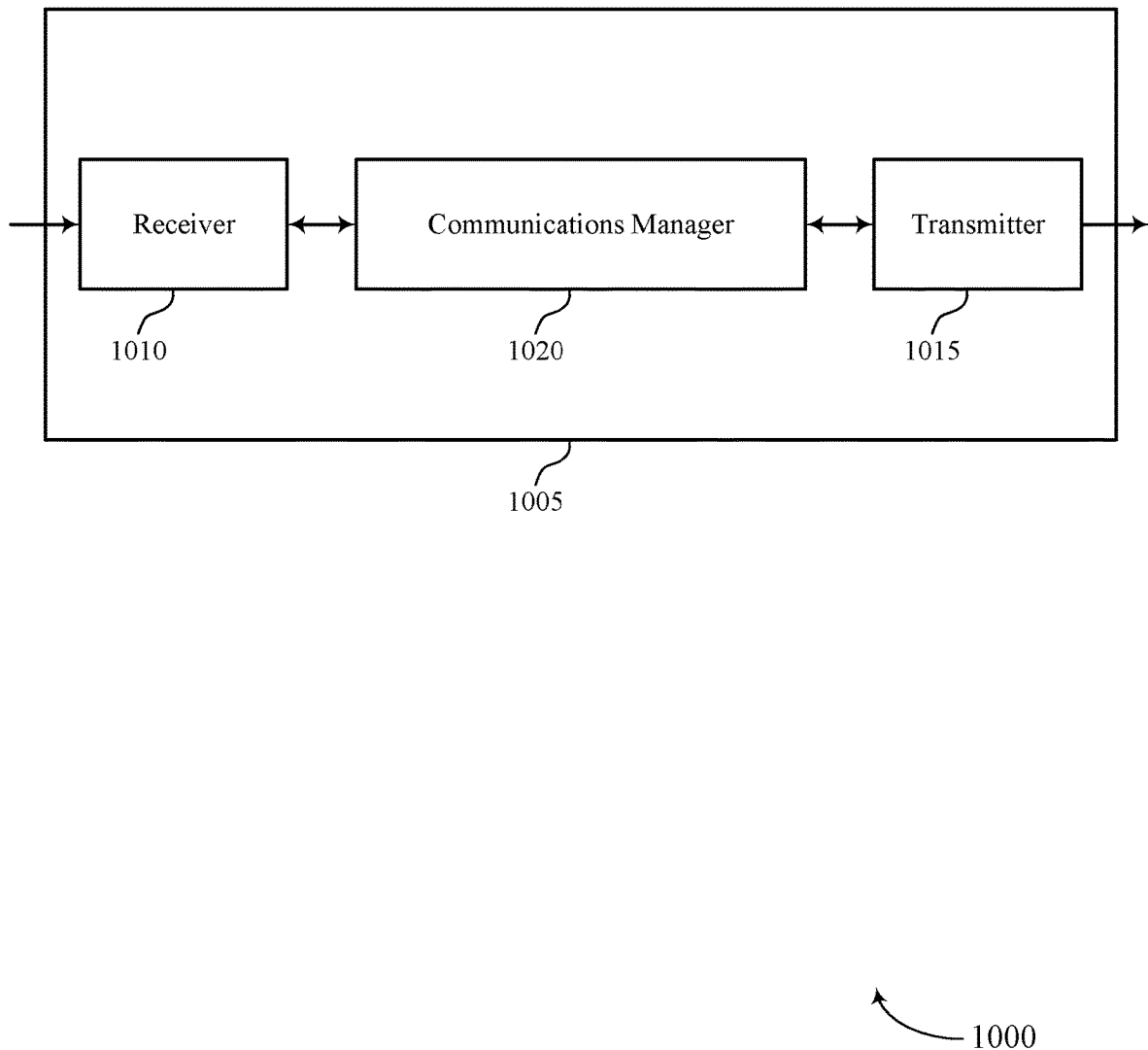
FIGS. 10 and 11 show block diagrams of devices that support HARQ feedback for sidelink in accordance with aspects of the present disclosure.

FIG. 10 shows a block diagram 1000 of a device 1005 that supports HARQ feedback for sidelink in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to HARQ feedback for sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to HARQ feedback for sidelink). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of HARQ feedback for sidelink as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting a grant that schedules a set of multiple sidelink occasions associated with sidelink communication from a UE, and that indicates a set of multiple uplink occasions for indicating feedback associated with the sidelink communication. The communications manager 1020 may be configured as or otherwise support a means for receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
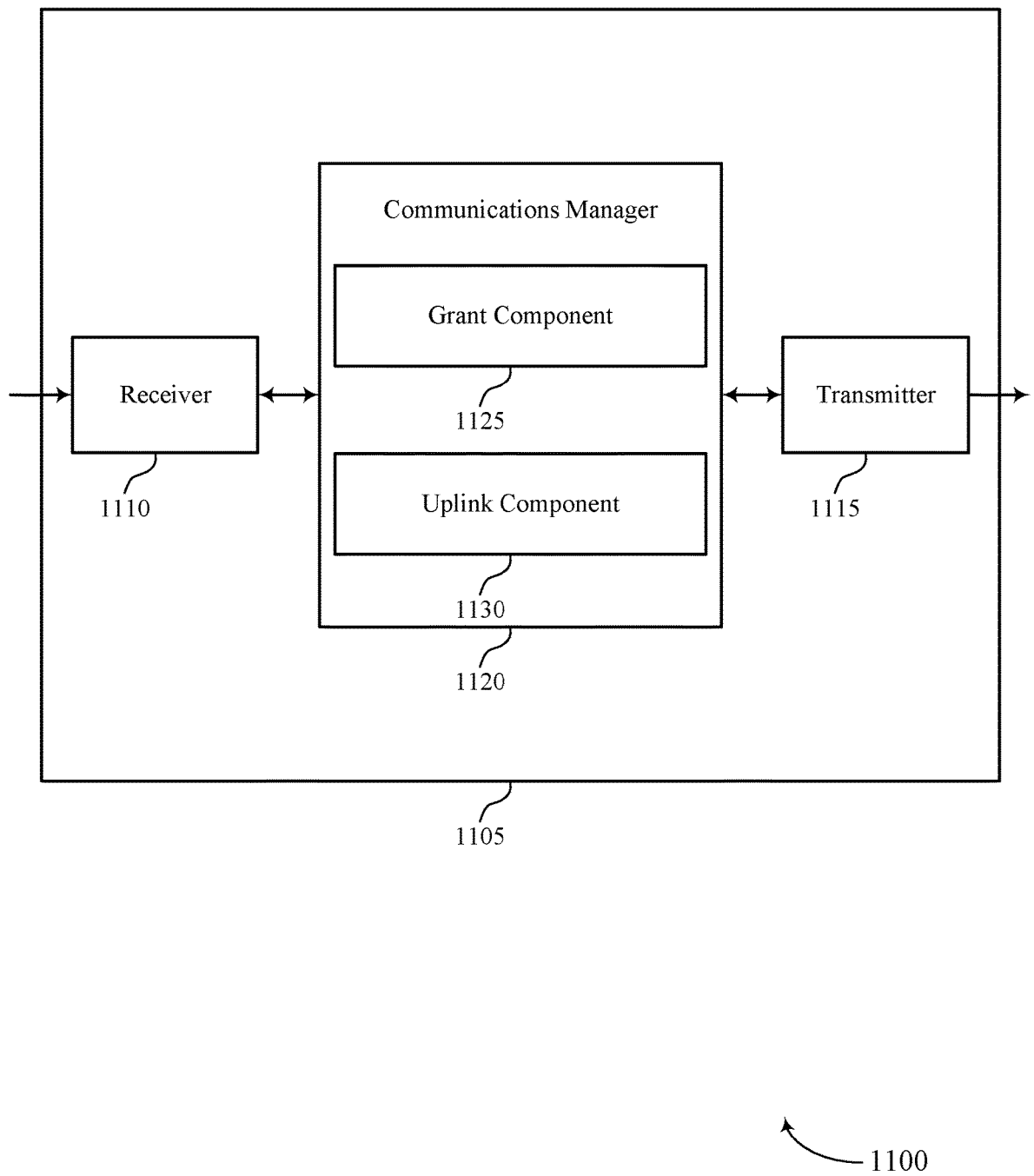

FIG. 11 shows a block diagram 1100 of a device 1105 that supports HARQ feedback for sidelink in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to HARQ feedback for sidelink). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to HARQ feedback for sidelink). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of HARQ feedback for sidelink as described herein. For example, the communications manager 1120 may include a grant component 1125 an uplink component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The grant component 1125 may be configured as or otherwise support a means for transmitting a grant that schedules a set of multiple sidelink occasions associated with sidelink communication from a UE, and that indicates a set of multiple uplink occasions for indicating feedback associated with the sidelink communication. The uplink component 1130 may be configured as or otherwise support a means for receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

Figure 12:
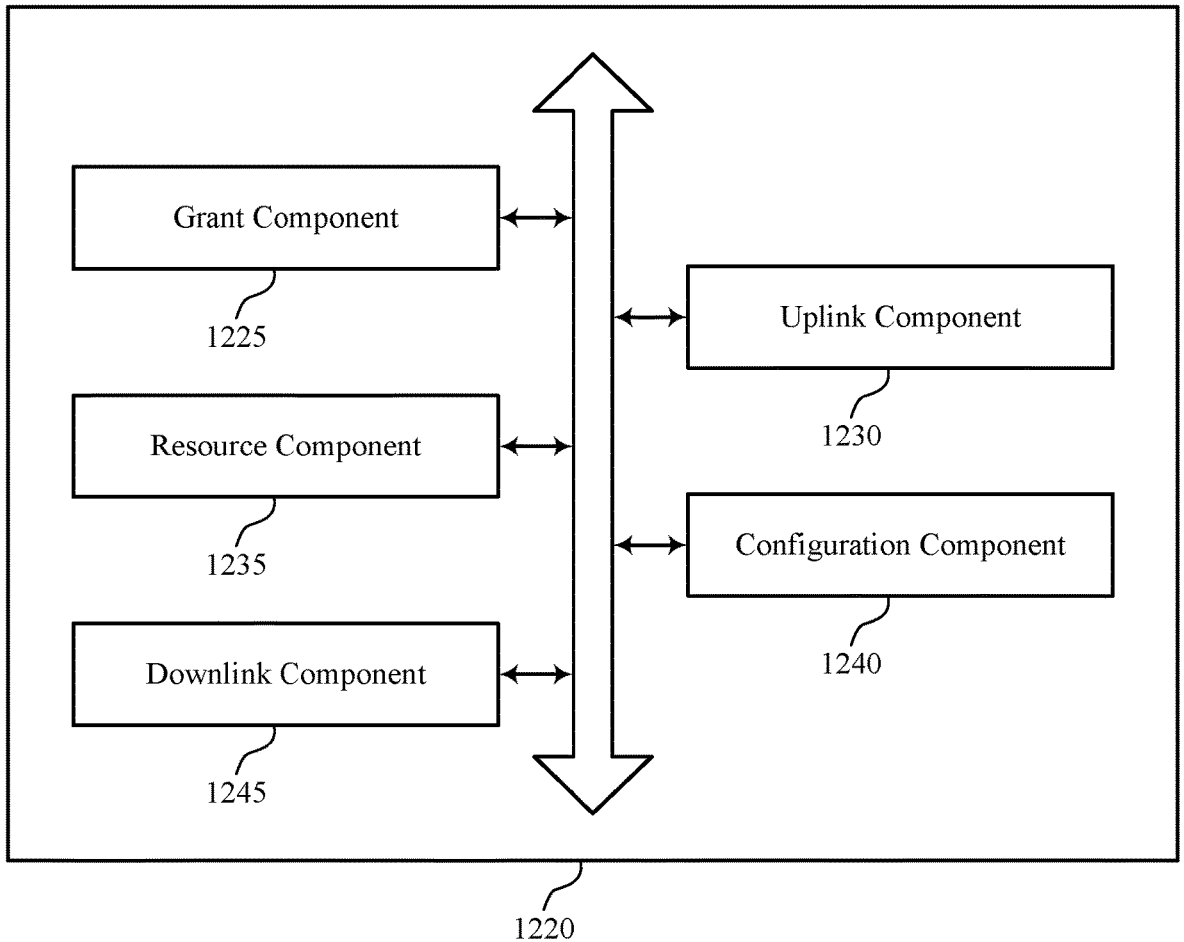
FIG. 12 shows a block diagram of a communications manager that supports HARQ feedback for sidelink in accordance with aspects of the present disclosure.

FIG. 12 shows a block diagram 1200 of a communications manager 1220 that supports HARQ feedback for sidelink in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of HARQ feedback for sidelink as described herein. For example, the communications manager 1220 may include a grant component 1225, an uplink component 1230, a resource component 1235, a configuration component 1240, a downlink component 1245, or any combination thereof. Each of these components may communicate, directly or indirectly, with one another (e.g., via one or more buses).

The communications manager 1220 may support wireless communication at a base station in accordance with examples as disclosed herein. The grant component 1225 may be configured as or otherwise support a means for transmitting a grant that schedules a set of multiple sidelink occasions associated with sidelink communication from a UE, and that indicates a set of multiple uplink occasions for indicating feedback associated with the sidelink communication. The uplink component 1230 may be configured as or otherwise support a means for receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

In some examples, the resource component 1235 may be configured as or otherwise support a means for releasing one or more sidelink resources associated with one or more subsequent sidelink occasions of the set of multiple sidelink occasions and one or more uplink resources associated with one or more subsequent uplink occasions of the set of multiple uplink occasions based on the uplink feedback message including the ACK. In some examples, the configuration component 1240 may be configured as or otherwise support a means for transmitting control signaling indicating a feedback reporting configuration. In some examples, the uplink component 1230 may be configured as or otherwise support a means for receiving the uplink feedback message during the uplink occasion based on the feedback reporting configuration.

In some examples, the downlink component 1245 may be configured as or otherwise support a means for transmitting a DCI indicating the grant that schedules the set of multiple sidelink occasions associated with the sidelink communication from the UE, and that indicates the set of multiple uplink occasions for indicating the feedback associated with the sidelink communication. In some examples, an uplink resource indicator associated with the DCI identifies the uplink occasion of the set of multiple uplink occasions, the uplink resource indicator including a PUCCH resource indicator.

Figure 13:
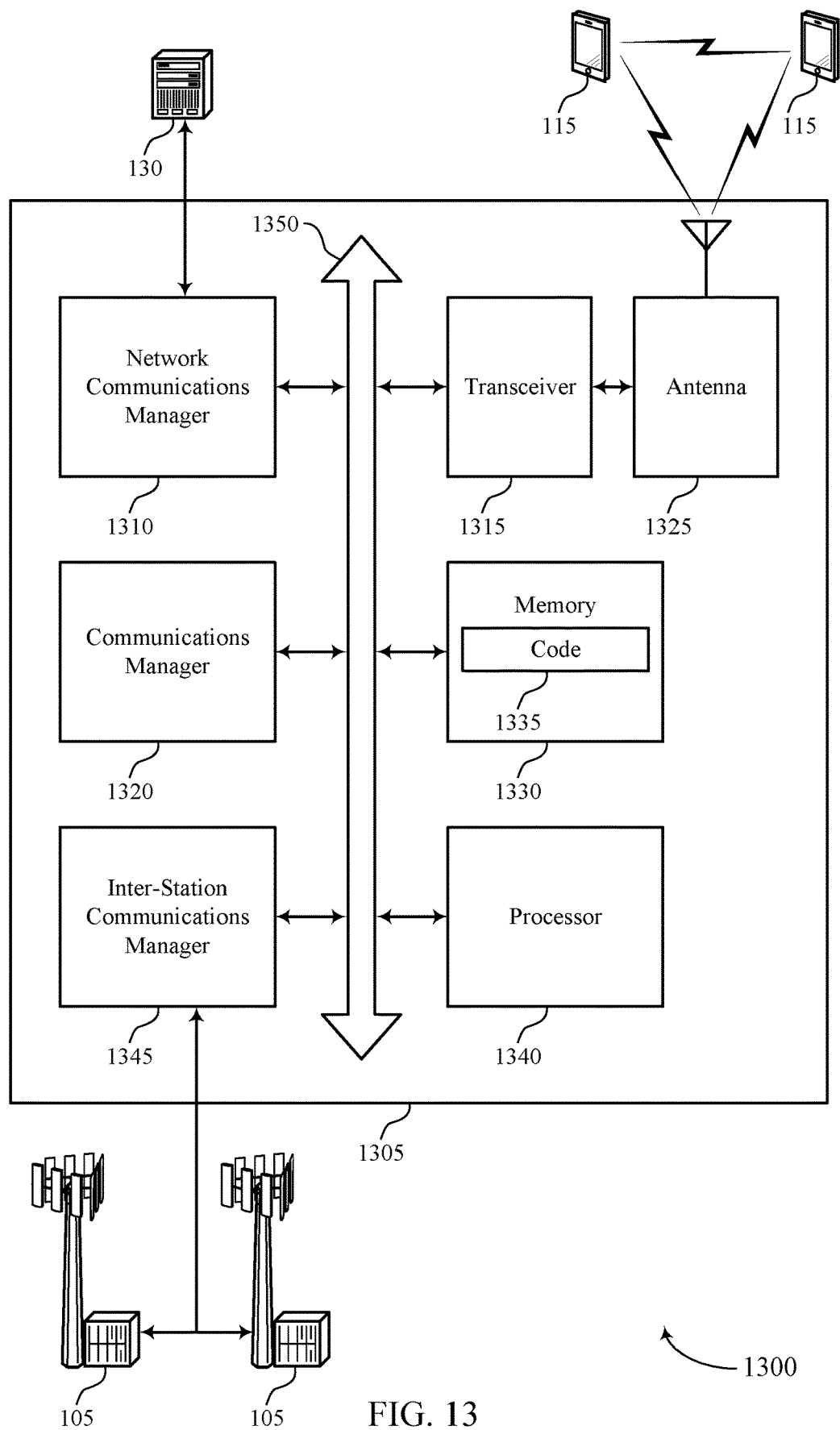
FIG. 13 shows a diagram of a system including a device that supports HARQ feedback for sidelink in accordance with aspects of the present disclosure.

FIG. 13 shows a diagram of a system 1300 including a device 1305 that supports HARQ feedback for sidelink in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325.

The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting HARQ feedback for sidelink). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting a grant that schedules a set of multiple sidelink occasions associated with sidelink communication from a UE, and that indicates a set of multiple uplink occasions for indicating feedback associated with the sidelink communication. The communications manager 1320 may be configured as or otherwise support a means for receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions.

By including or configuring the communications manager 1320 in accordance with examples as described herein, the device 1305 may support techniques for reduced latency, reduced power consumption, and more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of HARQ feedback for sidelink as described herein, or the processor 1340 and the memory 1330 may be otherwise configured to perform or support such operations.

Figure 14:
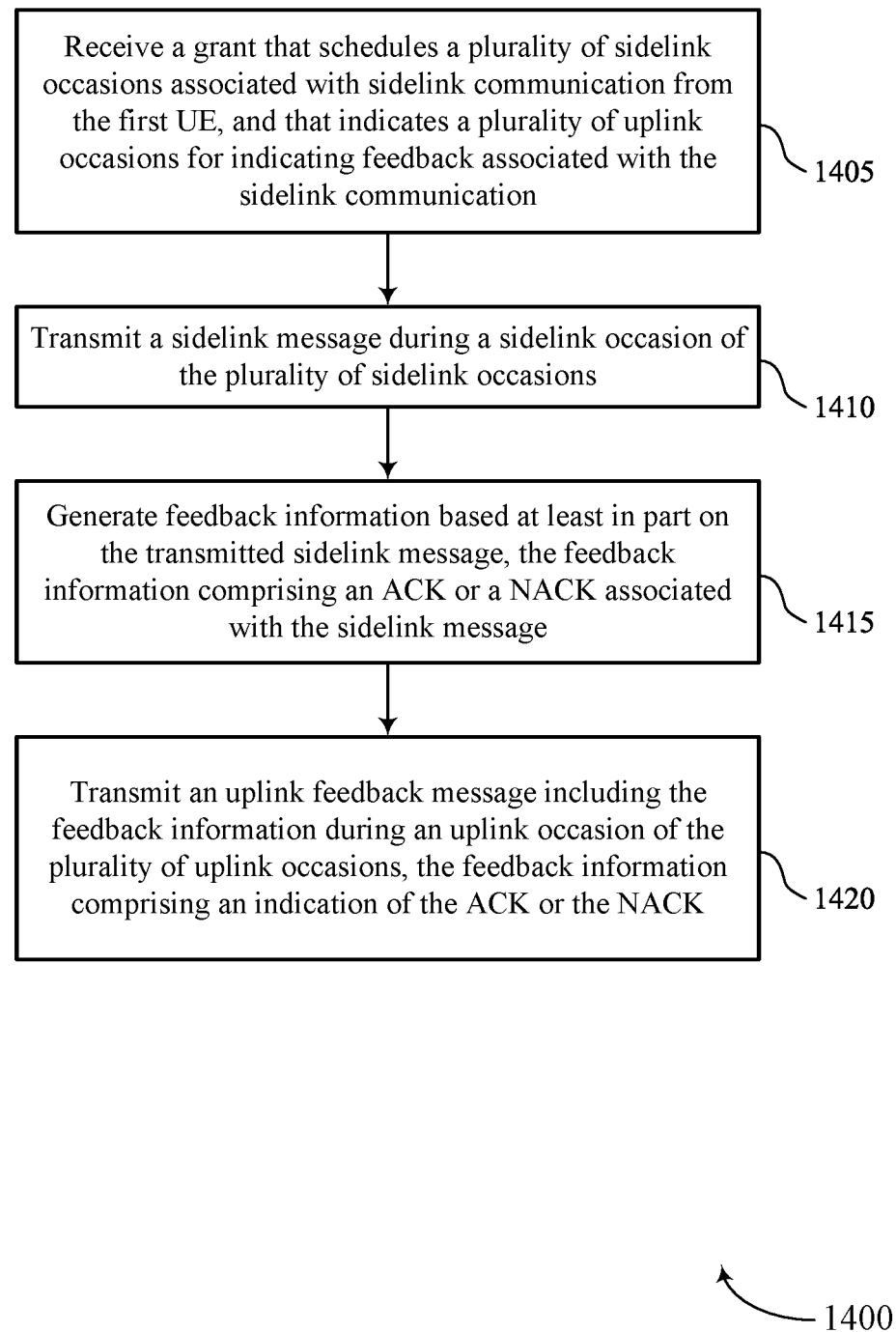
FIGS. 14 through 18 show flowcharts illustrating methods that support HARQ feedback for sidelink in accordance with aspects of the present disclosure.

FIG. 14 shows a flowchart illustrating a method 1400 that supports HARQ feedback for sidelink in accordance with aspects of the present disclosure. The operations of the method 1400 may be implemented by a UE (e.g., a first UE) or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a grant that schedules a set of multiple sidelink occasions associated with sidelink communication from the first UE, and that indicates a set of multiple uplink occasions for indicating feedback associated with the sidelink communication. The operations of 1405 may be performed in accordance with examples as disclosed herein. In some examples, aspects of the operations of 1405 may be performed by a grant component 825 as described with reference to FIG. 8.

At 1410, the method may include transmitting a sidelink message during a sidelink occasion of the set of multiple sidelink occasions. The operations of 1410 may be performed in accordance with examples as disclosed herein. In some examples, aspects of the operations of 1410 may be performed by a sidelink component 830 as described with reference to FIG. 8.

At 1415, the method may include generating feedback information based on the transmitted sidelink message, the feedback information including an ACK or a NACK associated with the sidelink message. The operations of 1415 may be performed in accordance with examples as disclosed herein. In some examples, aspects of the operations of 1415 may be performed by a feedback component 835 as described with reference to FIG. 8.

At 1420, the method may include transmitting an uplink feedback message including the feedback information during an uplink occasion of the set of multiple uplink occasions, the feedback information including an indication of the ACK or the NACK. The operations of 1420 may be performed in accordance with examples as disclosed herein. In some examples, aspects of the operations of 1420 may be performed by an uplink component 840 as described with reference to FIG. 8.

Figure 15:
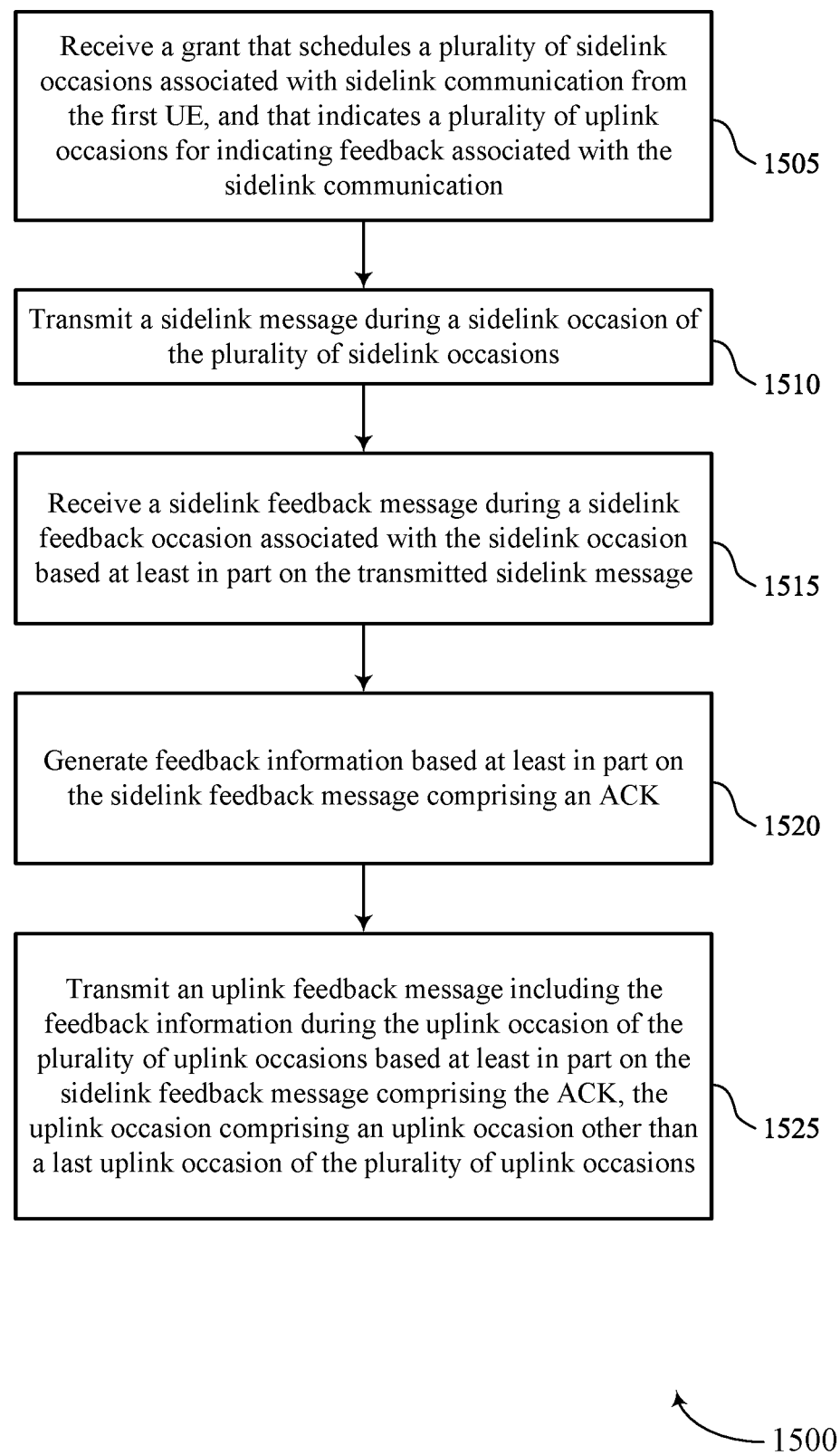

FIG. 15 shows a flowchart illustrating a method 1500 that supports HARQ feedback for sidelink in accordance with aspects of the present disclosure. The operations of the method 1500 may be implemented by a UE (e.g., a first UE) or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a grant that schedules a set of multiple sidelink occasions associated with sidelink communication from the first UE, and that indicates a set of multiple uplink occasions for indicating feedback associated with the sidelink communication. The operations of 1505 may be performed in accordance with examples as disclosed herein. In some examples, aspects of the operations of 1505 may be performed by a grant component 825 as described with reference to FIG. 8.

At 1510, the method may include transmitting a sidelink message during a sidelink occasion of the set of multiple sidelink occasions. The operations of 1510 may be performed in accordance with examples as disclosed herein. In some examples, aspects of the operations of 1510 may be performed by a sidelink component 830 as described with reference to FIG. 8.

At 1515, the method may include receiving a sidelink feedback message during a sidelink feedback occasion associated with the sidelink occasion based on the transmitted sidelink message. The operations of 1515 may be performed in accordance with examples as disclosed herein. In some examples, aspects of the operations of 1515 may be performed by a feedback component 835 as described with reference to FIG. 8.

At 1520, the method may include generating feedback information based on the sidelink feedback message including AN ACK. The operations of 1520 may be performed in accordance with examples as disclosed herein. In some examples, aspects of the operations of 1520 may be performed by a feedback component 835 as described with reference to FIG. 8.

At 1525, the method may include transmitting an uplink feedback message including the feedback information during the uplink occasion of the set of multiple uplink occasions based on the sidelink feedback message including the ACK, the uplink occasion including an uplink occasion other than a last uplink occasion of the set of multiple uplink occasions. The operations of 1525 may be performed in accordance with examples as disclosed herein. In some examples, aspects of the operations of 1525 may be performed by an uplink component 840 as described with reference to FIG. 8.

Figure 16:
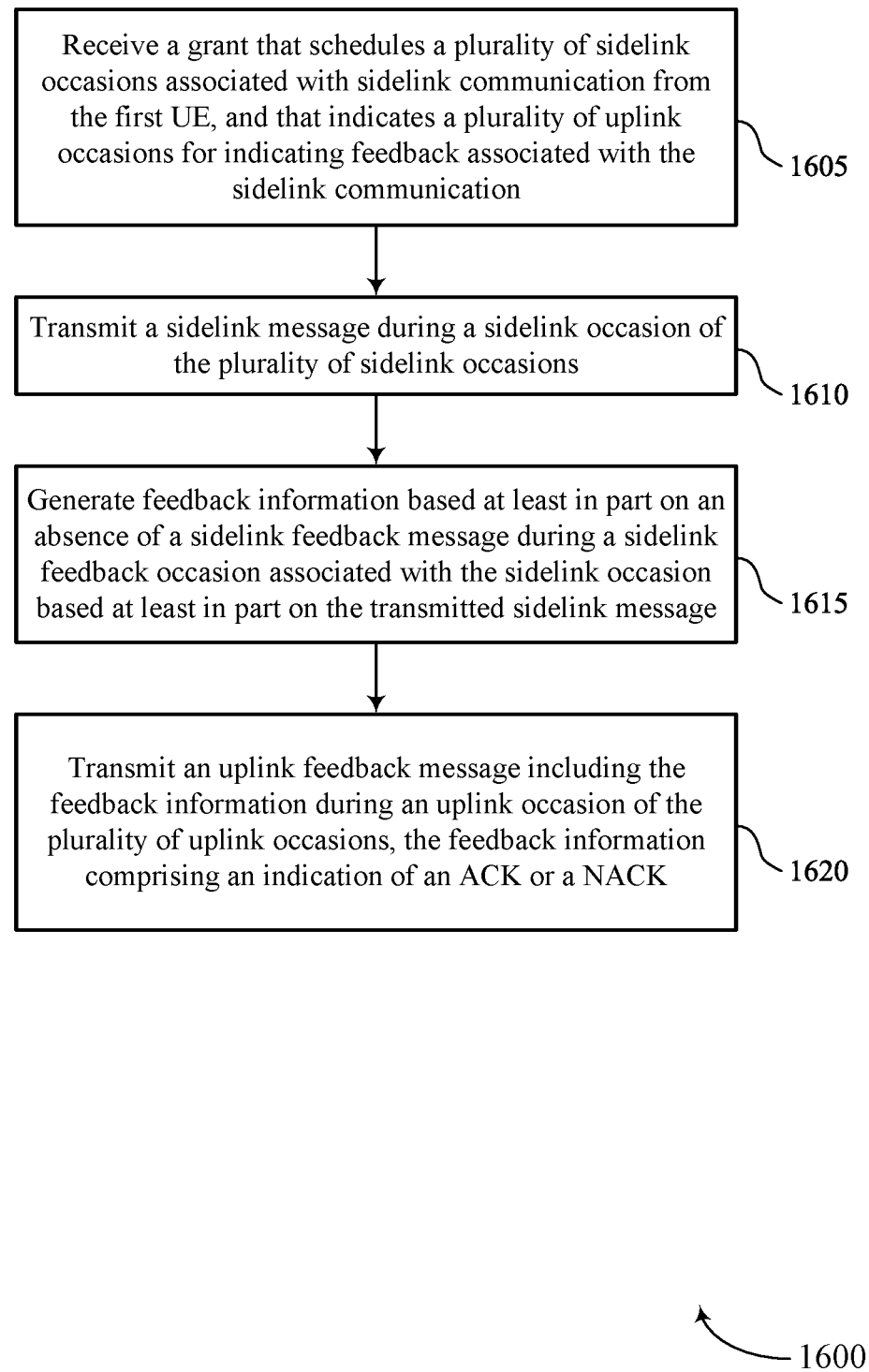

FIG. 16 shows a flowchart illustrating a method 1600 that supports HARQ feedback for sidelink in accordance with aspects of the present disclosure. The operations of the method 1600 may be implemented by a UE (e.g., a first UE) or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a grant that schedules a set of multiple sidelink occasions associated with sidelink communication from the first UE, and that indicates a set of multiple uplink occasions for indicating feedback associated with the sidelink communication. The operations of 1605 may be performed in accordance with examples as disclosed herein. In some examples, aspects of the operations of 1605 may be performed by a grant component 825 as described with reference to FIG. 8.

At 1610, the method may include transmitting a sidelink message during a sidelink occasion of the set of multiple sidelink occasions. The operations of 1610 may be performed in accordance with examples as disclosed herein. In some examples, aspects of the operations of 1610 may be performed by a sidelink component 830 as described with reference to FIG. 8.

At 1615, the method may include generating feedback information based on an absence of a sidelink feedback message during a sidelink feedback occasion associated with the sidelink occasion based on the transmitted sidelink message. The operations of 1615 may be performed in accordance with examples as disclosed herein. In some examples, aspects of the operations of 1615 may be performed by a feedback component 835 as described with reference to FIG. 8.

At 1620, the method may include transmitting an uplink feedback message including the feedback information during an uplink occasion of the set of multiple uplink occasions, the feedback information including an indication of an ACK or a NACK. The operations of 1620 may be performed in accordance with examples as disclosed herein. In some examples, aspects of the operations of 1620 may be performed by an uplink component 840 as described with reference to FIG. 8.

Figure 17:
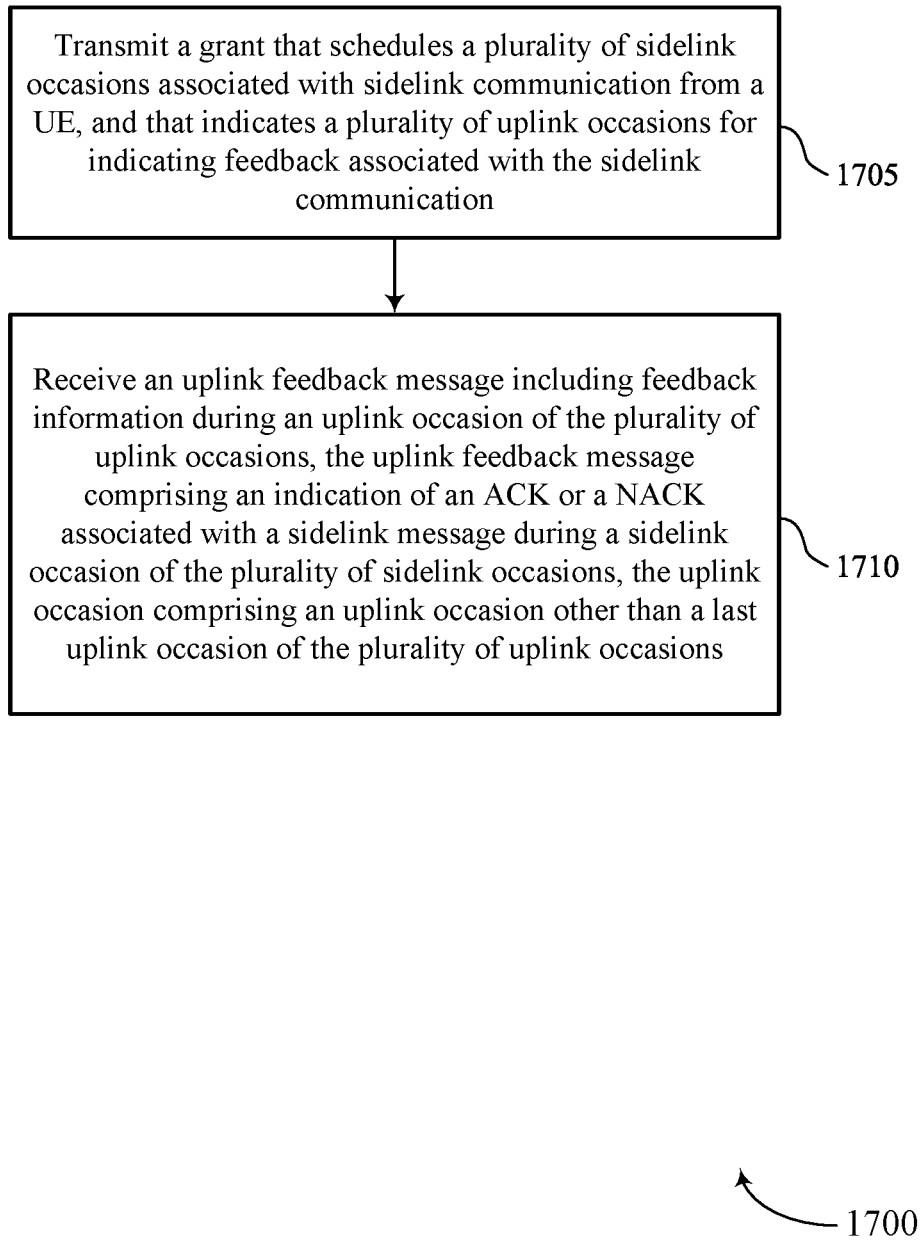

FIG. 17 shows a flowchart illustrating a method 1700 that supports HARQ feedback for sidelink in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting a grant that schedules a set of multiple sidelink occasions associated with sidelink communication from a UE, and that indicates a set of multiple uplink occasions for indicating feedback associated with the sidelink communication. The operations of 1705 may be performed in accordance with examples as disclosed herein. In some examples, aspects of the operations of 1705 may be performed by a grant component 1225 as described with reference to FIG. 12.

At 1710, the method may include receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions. The operations of 1710 may be performed in accordance with examples as disclosed herein. In some examples, aspects of the operations of 1710 may be performed by an uplink component 1230 as described with reference to FIG. 12.

Figure 18:
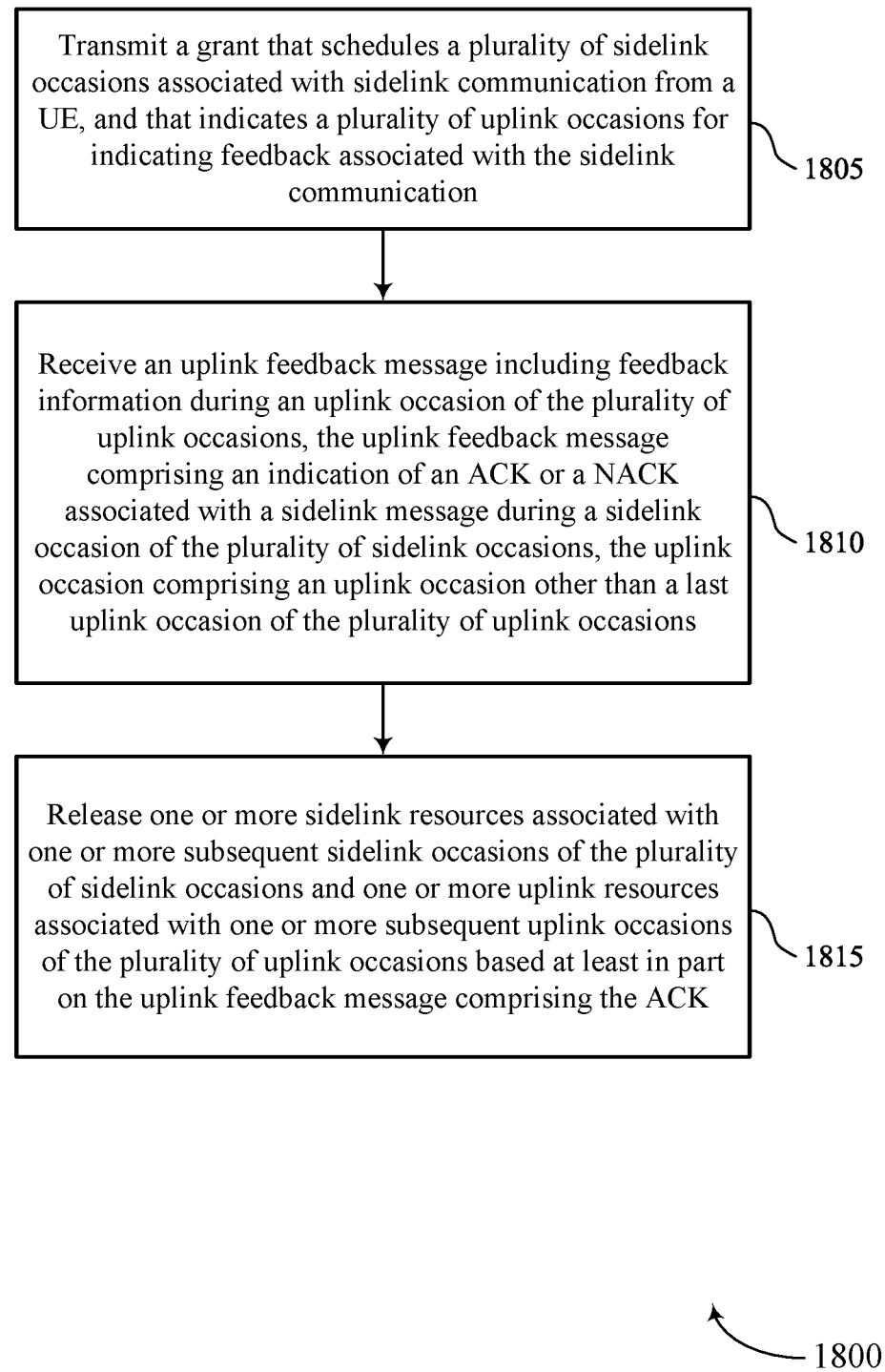

FIG. 18 shows a flowchart illustrating a method 1800 that supports HARQ feedback for sidelink in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting a grant that schedules a set of multiple sidelink occasions associated with sidelink communication from a UE, and that indicates a set of multiple uplink occasions for indicating feedback associated with the sidelink communication. The operations of 1805 may be performed in accordance with examples as disclosed herein. In some examples, aspects of the operations of 1805 may be performed by a grant component 1225 as described with reference to FIG. 12.

At 1810, the method may include receiving an uplink feedback message including feedback information during an uplink occasion of the set of multiple uplink occasions, the uplink feedback message including an indication of an ACK or a NACK associated with a sidelink message during a sidelink occasion of the set of multiple sidelink occasions, the uplink occasion including an uplink occasion other than a last uplink occasion of the set of multiple uplink occasions. The operations of 1810 may be performed in accordance with examples as disclosed herein. In some examples, aspects of the operations of 1810 may be performed by an uplink component 1230 as described with reference to FIG. 12.

At 1815, the method may include releasing one or more sidelink resources associated with one or more subsequent sidelink occasions of the set of multiple sidelink occasions and one or more uplink resources associated with one or more subsequent uplink occasions of the set of multiple uplink occasions based on the uplink feedback message including the ACK. The operations of 1815 may be performed in accordance with examples as disclosed herein. In some examples, aspects of the operations of 1815 may be performed by a resource component 1235 as described with reference to FIG. 12.

The following provides an overview of aspects of the present disclosure:

Aspect 1: A method for wireless communication at a first UE, comprising: receiving a grant that schedules a plurality of sidelink occasions associated with sidelink communication from the first UE, and that indicates a plurality of uplink occasions for indicating feedback associated with the sidelink communication; transmitting a sidelink message during a sidelink occasion of the plurality of sidelink occasions; generating feedback information based at least in part on the transmitted sidelink message, the feedback information comprising an ACK or a NACK associated with the sidelink message; and transmitting an uplink feedback message including the feedback information during an uplink occasion of the plurality of uplink occasions, the feedback information comprising an indication of the ACK or the NACK.

Aspect 2: The method of aspect 1, further comprising: receiving a sidelink feedback message during a sidelink feedback occasion associated with the sidelink occasion based at least in part on the transmitted sidelink message; generating the feedback information based at least in part on the sidelink feedback message comprising the ACK; and transmitting the uplink feedback message including the feedback information during the uplink occasion of the plurality of uplink occasions based at least in part on the sidelink feedback message comprising the ACK, the uplink occasion comprising an uplink occasion other than a last uplink occasion of the plurality of uplink occasions.

Aspect 3: The method of any of aspects 1 through 2, further comprising: generating the feedback information based at least in part on an absence of a sidelink feedback message during a sidelink feedback occasion associated with the sidelink occasion based at least in part on the transmitted sidelink message.

Aspect 4: The method of any of aspects 1 through 3, further comprising: identifying one or more sidelink resources associated with one or more subsequent sidelink occasions of the plurality of sidelink occasions as unavailable sidelink resources based at least in part on the feedback information comprising the ACK.

Aspect 5: The method of any of aspects 1 through 4, further comprising: identifying one or more uplink resources associated with one or more subsequent uplink occasions of the plurality of uplink occasions as unavailable uplink resources based at least in part on the feedback information comprising the ACK.

Aspect 6: The method of any of aspects 1 through 5, further comprising: receiving a sidelink feedback message during a sidelink feedback occasion associated with the sidelink occasion based at least in part on the transmitted sidelink message; and generating the feedback information based at least in part on the sidelink feedback message comprising the NACK.

Aspect 7: The method of aspect 6, further comprising: refraining from transmitting the uplink feedback message including the feedback information during the uplink occasion of the plurality of uplink occasions based at least in part on the sidelink feedback message comprising the NACK.

Aspect 8: The method of any of aspects 6 through 7, further comprising: identifying one or more sidelink resources associated with one or more subsequent sidelink occasions of the plurality of sidelink occasions as available sidelink resources based at least in part on the sidelink feedback message comprising the ACK.

Aspect 9: The method of any of aspects 6 through 8, further comprising: identifying one or more uplink resources associated with one or more subsequent uplink occasions of the plurality of uplink occasions as available uplink resources based at least in part on the sidelink feedback message comprising the NACK.

Aspect 10: The method of any of aspects 6 through 9, wherein refraining from transmitting the uplink feedback message including the feedback information during the uplink occasion of the plurality of uplink occasions is based at least in part on that the sidelink feedback message comprises the NACK and that the uplink occasion comprises an uplink occasion other than a last uplink occasion of the plurality of uplink occasions.

Aspect 11: The method of any of aspects 1 through 10, further comprising: determining that the uplink occasion of the plurality of uplink occasions comprises a last uplink occasion of the plurality of uplink occasions; and transmitting the uplink feedback message including the feedback information during the last uplink occasion of the plurality of uplink occasions based at least in part on the feedback information comprising the NACK and that the uplink occasion comprises the last uplink occasion of the plurality of uplink occasions.

Aspect 12: The method of any of aspects 1 through 11, further comprising: receiving control signaling indicating a feedback reporting configuration; and transmitting the uplink feedback message during the uplink occasion of the plurality of uplink occasions based at least in part on the feedback reporting configuration.

Aspect 13: The method of any of aspects 1 through 12, further comprising: receiving a DCI indicating the grant that schedules the plurality of sidelink occasions associated with the sidelink communication from the first UE to a second UE or a group of UEs, and that indicates the plurality of uplink occasions for indicating the feedback information associated with the sidelink communication.

Aspect 14: The method of aspect 13, further comprising: determining the uplink occasion of the plurality of uplink occasions based at least in part on an uplink resource indicator associated with the DCI; and determining the sidelink occasion of the plurality of sidelink occasions based at least in part on a feedback timing indicator associated with the DCI.

Aspect 15: The method of aspect 14, further comprising: determining that the sidelink occasion corresponds to the uplink occasion based at least in part on one or more of the uplink resource indicator or the feedback timing indicator, wherein transmitting the uplink feedback message including the feedback information during the uplink occasion of the plurality of uplink occasions is based at least in part on determining that the sidelink occasion corresponds to the uplink occasion.

Aspect 16: The method of any of aspects 14 through 15, wherein the sidelink occasions are associated with transmissions of a same transport block.

Aspect 17: The method of any of aspects 14 through 16, wherein the feedback timing indicator comprises a HARQ feedback timing indicator identifying a duration between a sidelink feedback message and the uplink feedback message, the sidelink feedback message corresponding to a PSFCH transmission and the uplink feedback message corresponding to a PUCCH transmission.

Aspect 18: The method of any of aspects 1 through 17, wherein each respective sidelink occasion of the plurality of sidelink occasions corresponds to each respective uplink occasion of the plurality of uplink occasions.

Aspect 19: The method of any of aspects 1 through 18, wherein each respective sidelink occasion of the plurality of sidelink occasions occurs before each respective uplink occasion of the plurality of uplink occasions.

Aspect 20: The method of any of aspects 1 through 19, wherein the grant schedules the transmitting of the uplink feedback message to occur after monitoring for a sidelink feedback message receiving of a sidelink feedback message and before transmitting a second sidelink message, wherein a gap between the monitoring for the sidelink feedback message and the transmitting of the uplink feedback message is greater than a threshold.

Aspect 21: The method of any of aspects 1 through 20, further comprising: transmitting the uplink feedback message after a second sidelink occasion of the plurality of sidelink occasions based at least in part on the second sidelink occasion of the plurality of sidelink occasions being scheduled before the uplink occasion of the plurality of uplink occasions.

Aspect 22: The method of any of aspects 1 through 21, wherein the sidelink message corresponds to one or more of a PSCCH transmission or a PSSCH transmission, and a sidelink feedback message corresponds to a PSFCH transmission.

Aspect 23: The method of any of aspects 1 through 22, wherein the plurality of sidelink occasions comprises one or more PSCCH occasions or one or more PSSCH occasions, and the plurality of uplink occasions comprises one or more PUCCH occasions.

Aspect 24: A method for wireless communication at a base station, comprising: transmitting a grant that schedules a plurality of sidelink occasions associated with sidelink communication from a UE, and that indicates a plurality of uplink occasions for indicating feedback associated with the sidelink communication; receiving an uplink feedback message including feedback information during an uplink occasion of the plurality of uplink occasions, the uplink feedback message comprising an indication of an ACK or a NACK associated with a sidelink message during a sidelink occasion of the plurality of sidelink occasions, the uplink occasion comprising an uplink occasion other than a last uplink occasion of the plurality of uplink occasions.

Aspect 25: The method of aspect 24, further comprising: releasing one or more sidelink resources associated with one or more subsequent sidelink occasions of the plurality of sidelink occasions and one or more uplink resources associated with one or more subsequent uplink occasions of the plurality of uplink occasions based at least in part on the uplink feedback message comprising the ACK.

Aspect 26: The method of any of aspects 24 through 25, further comprising: transmitting control signaling indicating a feedback reporting configuration; and receiving the uplink feedback message during the uplink occasion based at least in part on the feedback reporting configuration.

Aspect 27: The method of any of aspects 24 through 26, further comprising: transmitting a DCI indicating the grant that schedules the plurality of sidelink occasions associated with the sidelink communication from the UE, and that indicates the plurality of uplink occasions for indicating the feedback associated with the sidelink communication.

Aspect 28: The method of aspect 27, wherein an uplink resource indicator associated with the DCI identifies the uplink occasion of the plurality of uplink occasions, the uplink resource indicator comprising a PUCCH resource indicator.

Aspect 29: An apparatus for wireless communication at a first UE, comprising a processor; memory coupled with the processor; and instructions stored in the memory and executable by the processor to cause the apparatus to perform a method of any of aspects 1 through 23.

Aspect 30: An apparatus for wireless communication at a first UE, comprising at least one means for performing a method of any of aspects 1 through 23.

Aspect 31: A non-transitory computer-readable medium storing code for wireless communication at a first UE, the code comprising instructions executable by a processor to perform a method of any of aspects 1 through 23.

Aspect 32: An apparatus for wireless communication at a base station, comprising a processor; memory coupled with the processor; and instructions stored in the memory and executable by the processor to cause the apparatus to perform a method of any of aspects 24 through 28.

Aspect 33: An apparatus for wireless communication at a base station, comprising at least one means for performing a method of any of aspects 24 through 28.

Aspect 34: A non-transitory computer-readable medium storing code for wireless communication at a base station, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving a grant that schedules a plurality of sidelink occasions associated with sidelink communication from the first UE, and a plurality of uplink occasions for indicating feedback associated with the sidelink communication;
   transmitting a sidelink message during a sidelink occasion of the scheduled plurality of sidelink occasions; and
   transmitting an uplink feedback message including the feedback information during an uplink occasion other than a last uplink occasion of the scheduled plurality of uplink occasions.

2. The method of claim 1, further comprising:
   receiving a sidelink feedback message during a sidelink feedback occasion associated with the sidelink occasion based at least in part on the transmitted sidelink message;
   generating the feedback information based at least in part on the sidelink feedback message comprising the acknowledgement; and
   transmitting the uplink feedback message including the feedback information during the uplink occasion of the scheduled plurality of uplink occasions based at least in part on the sidelink feedback message comprising the acknowledgement.

3. The method of claim 1, further comprising:
   generating the feedback information based at least in part on an absence of a sidelink feedback message during a sidelink feedback occasion associated with the sidelink occasion based at least in part on the transmitted sidelink message.

4. The method of claim 1, further comprising:
   identifying one or more sidelink resources associated with one or more subsequent sidelink occasions of the scheduled plurality of sidelink occasions as unavailable sidelink resources based at least in part on the feedback information comprising an acknowledgement.

5. The method of claim 1, further comprising:
   identifying one or more uplink resources associated with one or more subsequent uplink occasions of the scheduled plurality of uplink occasions as unavailable uplink resources based at least in part on the feedback information comprising an acknowledgement.

6. The method of claim 1, further comprising:
   receiving a sidelink feedback message during a sidelink feedback occasion associated with the sidelink occasion based at least in part on the transmitted sidelink message; and
   generating the feedback information based at least in part on the sidelink feedback message comprising the negative acknowledgment.

7. The method of claim 6, further comprising:
   refraining from transmitting the uplink feedback message including the feedback information during the uplink occasion of the scheduled plurality of uplink occasions based at least in part on the sidelink feedback message comprising the negative acknowledgment.

8. The method of claim 6, further comprising:
identifying one or more sidelink resources associated with one or more subsequent sidelink occasions of the scheduled plurality of sidelink occasions as available sidelink resources based at least in part on the sidelink feedback message comprising the acknowledgement.

9. The method of claim 6, further comprising:
identifying one or more uplink resources associated with one or more subsequent uplink occasions of the scheduled plurality of uplink occasions as available uplink resources based at least in part on the sidelink feedback message comprising the negative acknowledgment.

10. The method of claim 6, wherein refraining from transmitting the uplink feedback message including the feedback information during the uplink occasion of the scheduled plurality of uplink occasions is based at least in part on that the sidelink feedback message comprises the negative acknowledgment and that the uplink occasion comprising the uplink occasion other than the last uplink occasion of the scheduled plurality of uplink occasions.

11. The method of claim 1, further comprising:
receiving control signaling indicating a feedback reporting configuration; and
transmitting the uplink feedback message during the uplink occasion of the scheduled plurality of uplink occasions based at least in part on the feedback reporting configuration.

12. The method of claim 1, further comprising:
receiving a downlink control information indicating the grant that schedules the plurality of sidelink occasions associated with the sidelink communication from the first UE to a second UE or a group of UEs, and the scheduled plurality of uplink occasions for indicating the feedback information associated with the sidelink communication.

13. The method of claim 12, further comprising:
determining the uplink occasion of the scheduled plurality of uplink occasions based at least in part on an uplink resource indicator associated with the downlink control information; and
determining the sidelink occasion of the scheduled plurality of sidelink occasions based at least in part on a feedback timing indicator associated with the downlink control information.

14. The method of claim 13, further comprising:
determining that the sidelink occasion corresponds to the uplink occasion based at least in part on one or more of the uplink resource indicator or the feedback timing indicator,
wherein transmitting the uplink feedback message including the feedback information during the uplink occasion of the scheduled plurality of uplink occasions is based at least in part on determining that the sidelink occasion corresponds to the uplink occasion.

15. The method of claim 13, wherein the scheduled plurality of sidelink occasions are associated with transmissions of a same transport block.

16. The method of claim 13, wherein the feedback timing indicator comprises a hybrid automatic repeat request feedback timing indicator identifying a duration between a sidelink feedback message and the uplink feedback message, the sidelink feedback message corresponding to a physical sidelink feedback channel transmission and the uplink feedback message corresponding to a physical uplink control channel transmission.

17. The method of claim 1, wherein each respective sidelink occasion of the scheduled plurality of sidelink occasions corresponds to each respective uplink occasion of the scheduled plurality of uplink occasions.

18. The method of claim 1, wherein each respective sidelink occasion of the scheduled plurality of sidelink occasions occurs before each respective uplink occasion of the scheduled plurality of uplink occasions.

19. The method of claim 1, wherein the grant schedules the transmitting of the uplink feedback message to occur after monitoring for a sidelink feedback message and before transmitting a second sidelink message, wherein a gap between the monitoring for the sidelink feedback message and the transmitting of the uplink feedback message is greater than a threshold.

20. The method of claim 1, further comprising:
transmitting the uplink feedback message after a second sidelink occasion of the scheduled plurality of sidelink occasions based at least in part on the second sidelink occasion of the scheduled plurality of sidelink occasions being scheduled before the uplink occasion of the scheduled plurality of uplink occasions.

21. The method of claim 1, wherein the sidelink message corresponds to one or more of a physical sidelink control channel transmission or a physical sidelink shared channel transmission, and a sidelink feedback message corresponds to a physical sidelink feedback channel transmission.

22. The method of claim 1, wherein the scheduled plurality of sidelink occasions comprises one or more physical sidelink control channel occasions or one or more physical sidelink shared channel occasions, and the scheduled plurality of uplink occasions comprises one or more physical uplink control channel occasions.

23. A method for wireless communication at a network entity, comprising:
transmitting a grant that schedules a plurality of sidelink occasions associated with sidelink communication from a user equipment (UE) and a plurality of uplink occasions for indicating feedback associated with the sidelink communication; and
receiving an uplink feedback message including feedback information during an uplink occasion other than a last uplink occasion of the scheduled plurality of uplink occasions.

24. The method of claim 23, further comprising:
releasing one or more sidelink resources associated with one or more subsequent sidelink occasions of the scheduled plurality of sidelink occasions and one or more uplink resources associated with one or more subsequent uplink occasions of the scheduled plurality of uplink occasions based at least in part on the uplink feedback message comprising an acknowledgement.

25. The method of claim 23, further comprising:
transmitting control signaling indicating a feedback reporting configuration; and
receiving the uplink feedback message during the uplink occasion based at least in part on the feedback reporting configuration.

26. The method of claim 23, further comprising:
transmitting a downlink control information indicating the grant that schedules the plurality of sidelink occasions associated with the sidelink communication from the UE and the plurality of uplink occasions for indicating the feedback information associated with the sidelink communication.

27. The method of claim 26, wherein an uplink resource indicator associated with the downlink control information identifies the uplink occasion of the scheduled plurality of uplink occasions, the uplink resource indicator comprising a physical uplink control channel resource indicator.

28. An apparatus for wireless communication at a first user equipment (UE), comprising:
a processor;
memory coupled with the processor; and
instructions stored in the memory and executable by the processor to cause the apparatus to:
receive a grant that schedules a plurality of sidelink occasions associated with sidelink communication from the first UE and a plurality of uplink occasions for indicating feedback information associated with the sidelink communication;
transmit a sidelink message during a sidelink occasion of the scheduled plurality of sidelink occasions; and
transmit an uplink feedback message including the feedback information during an uplink occasion other than a last uplink occasion of the scheduled plurality of uplink occasions.

29. An apparatus for wireless communication at a network entity, comprising:
a processor;
memory coupled with the processor; and
instructions stored in the memory and executable by the processor to cause the apparatus to:
transmit a grant that schedules a plurality of sidelink occasions associated with sidelink communication from a user equipment (UE) and a plurality of uplink occasions for indicating feedback associated with the sidelink communication; and
receive an uplink feedback message including feedback information during an uplink occasion other than a last uplink occasion of the plurality of scheduled uplink occasions.

* * * * *